United States Patent
Vam et al.

(10) Patent No.: US 12,201,921 B2
(45) Date of Patent: Jan. 21, 2025

(54) LIQUID-LIQUID EXTRACTION TECHNIQUES

(71) Applicant: University of Dayton Research Institute, Dayton, OH (US)

(72) Inventors: Albert Vam, Springboro, OH (US); Giacomo Flora, Kettering, OH (US)

(*) Notice: Subject to any disclaimer, the term of this patent is extended or adjusted under 35 U.S.C. 154(b) by 615 days.

(21) Appl. No.: 17/474,989

(22) Filed: Sep. 14, 2021

(65) Prior Publication Data

US 2023/0085114 A1    Mar. 16, 2023

(51) Int. Cl.
*B01D 11/04* (2006.01)
*C10G 21/30* (2006.01)

(52) U.S. Cl.
CPC ...... *B01D 11/0484* (2013.01); *B01D 11/0492* (2013.01); *C10G 21/30* (2013.01); *B01D 11/0426* (2013.01); *B01D 11/0434* (2013.01)

(58) Field of Classification Search
CPC ............ B01D 11/0488; B01D 11/0492; B01D 11/0426; B01D 11/0434; C10G 21/30
See application file for complete search history.

(56) References Cited

U.S. PATENT DOCUMENTS

2023/0271103 A1*   8/2023   Nieuwoudt ........ B01D 53/1412
                                                                      95/8

FOREIGN PATENT DOCUMENTS

CN            107699280 A   *   2/2018

* cited by examiner

*Primary Examiner* — Thuan D Dang
(74) *Attorney, Agent, or Firm* — Thomas E. Lees, LLC

(57) ABSTRACT

A liquid-liquid extraction system includes extraction stages, a pumping system, and a controller. Each extraction stage has a chamber, a primary input, a raffinate output, and an extract output. An input liquid (e.g., either a source liquid or raffinate from a preceding extraction stage, mixed with an extraction liquid) is presented to the chamber via the primary input. The chamber enables phase separation of liquid therein, into a raffinate and a extract, where the raffinate exits the separation vessel at the raffinate output, and the extract exits the separation vessel at the extract output. A level sensor is coupled to the chamber and the controller is operatively programmed to read an output of the level sensor, compare the output of the level sensor to a target, and cause the associated chamber to receive additional liquid if the output is lower than the target.

20 Claims, 13 Drawing Sheets

LIQUID-LIQUID EXTRACTION TECHNIQUES

STATEMENT REGARDING FEDERALLY SPONSORED RESEARCH OR DEVELOPMENT

This invention was made with government support under FA8650-13-D-5600 TO 0004 awarded by the Department of the Air Force. The government has certain rights in the invention.

BACKGROUND

Various aspects of the present disclosure relate generally to purification techniques, and more particularly to the purification of liquids such as fuels, organic solvents, other non-polar compounds, etc.

Liquids can carry impurities that need to be removed in order to make the liquid more suitable for an intended use. For instance, in the context of fuels, sulfur is an undesirable impurity that is often present in relatively high concentrations. When present in fuels, sulfur can reduce the life of an engine due to corrosion. Moreover, sulfur compounds released in the exhaust gases of diesel engines can significantly impair the emission control technologies designed to meet existing emission standards. Likewise, other liquids can carry impurities, where it is desirable to reduce the level of impurity therein.

BRIEF SUMMARY

According to aspects of the present disclosure, a liquid-liquid extraction system is comprised of extraction stages, a pumping system, and a controller. The extraction stages collectively extract impurities from a source liquid using an extraction liquid. More specifically, each extraction stage comprises a separation vessel having a chamber, a primary input, a raffinate output, and an extract output. An input liquid is presented to the chamber via the primary input. The chamber enables phase separation of liquids therein, into a raffinate and an extract, where the extract comprises at least a portion of an impurity transferred from the input liquid, and the raffinate comprises liquid from the chamber having impurities drawn therefrom. The raffinate exits the separation vessel at the raffinate output, and the extract exits the separation vessel at the extract output.

A level sensor is coupled to the chamber to measure a characteristic of the liquids therein, e.g., to measure the level of interphase between the liquids therein. Yet further, the controller couples to each level sensor. The controller is operatively programmed to control the liquids, e.g., to control the overall level of the liquid and interphase between the two phases in each chamber by processing instructions to read an output of the corresponding level sensor, compare the output of the corresponding level sensor to a target, cause the associated chamber to receive additional liquid to raise the liquid level in the chamber if the output is lower than the target, and cause the associated chamber to drain liquid to lower the liquid level in the chamber if the output is higher than the target.

Additionally, in some embodiments, the pumping system controls the pumping of both the source liquid and the extraction liquid through each of the extraction stages. In some configurations, the pumping system also controls the pumping of the subsequent raffinate and extract obtained through each of the extraction stages.

According to further aspects of the present disclosure, a continuous liquid-liquid extraction system is provided. The system comprises extraction stages, a pumping system, and a controller. Here, the extraction stages collectively filter a source liquid using an extraction liquid. More particularly, each extraction stage comprises a separation vessel having a chamber, a primary input, a raffinate output, and a extract output. An input liquid is presented to the chamber via the primary input. The chamber enables phase separation of liquid therein, into a raffinate and an extract, where the extract is comprised of at least a portion of an impurity transferred from the input liquid, and the raffinate comprises liquid from the chamber having impurities drawn therefrom. The raffinate exits the separation vessel at the raffinate output, and the extract exits the separation vessel at the extract output. Also, a level sensor is coupled to the chamber to measure a level of liquid therein. The pumping system controls the pumping of the source liquid and the extraction liquid through each of the extraction stages. The controller couples to each level sensor, where the controller is operatively programmed to control a phase of liquid in each chamber by processing instructions to read an output of the corresponding level sensor, compare the output of the corresponding level sensor to a target, cause the associated chamber to receive additional liquid to raise the liquid level in the chamber if the output is lower than the target, and cause the associated chamber to drain liquid to lower the liquid level in the chamber if the output is higher than the target. In some embodiments, the controller and the pumping system operate independently of each other.

DETAILED DESCRIPTION

According to various aspects of the present disclosure, technologies are provided, which efficiently remove impurities from a liquid source. By way of non-limiting example, techniques disclosed herein can achieve very low sulfur impurity concentrations ('deep desulfurization') in an application such as desulfurizing fuel. Moreover, aspects herein make it possible to economically design, manufacture, and maintain a liquid extraction system of compact size, exhibiting low operational costs, and moderate logistical burden. Thus, an extraction system can be practically manufactured and transported to a point of need. In this regard, embodiments can be implemented as a mobile liquid-liquid extraction system.

In general terms, the systems and processes herein can be combined in any practical manner with any combination of components set out in U.S. patent application Ser. No. 17/201,903 filed Mar. 15, 2021, with the title "Desulfurization Techniques", the entirety of the disclosure of which is incorporated by reference herein in its entirety.

According to further aspects herein, a fully functional, multistage, fully automated, liquid-liquid extraction system is provided with its own (optionally single) pumping station and control system. This system can be used as a standalone unit of operation or a part of multistep process. The pumping station and the control system each play a role in controlling the liquid-liquid extraction process as set out herein.

According to aspects herein, an extraction liquid is utilized to remove impurities from a source liquid. In this regard, terms including extraction fluid, extraction liquid, extract, and solvent are used interchangeably. The term extract is also used to refer to an extraction liquid that carries some level of impurity.

Example—Liquid-Liquid Extraction System

Figure 1:
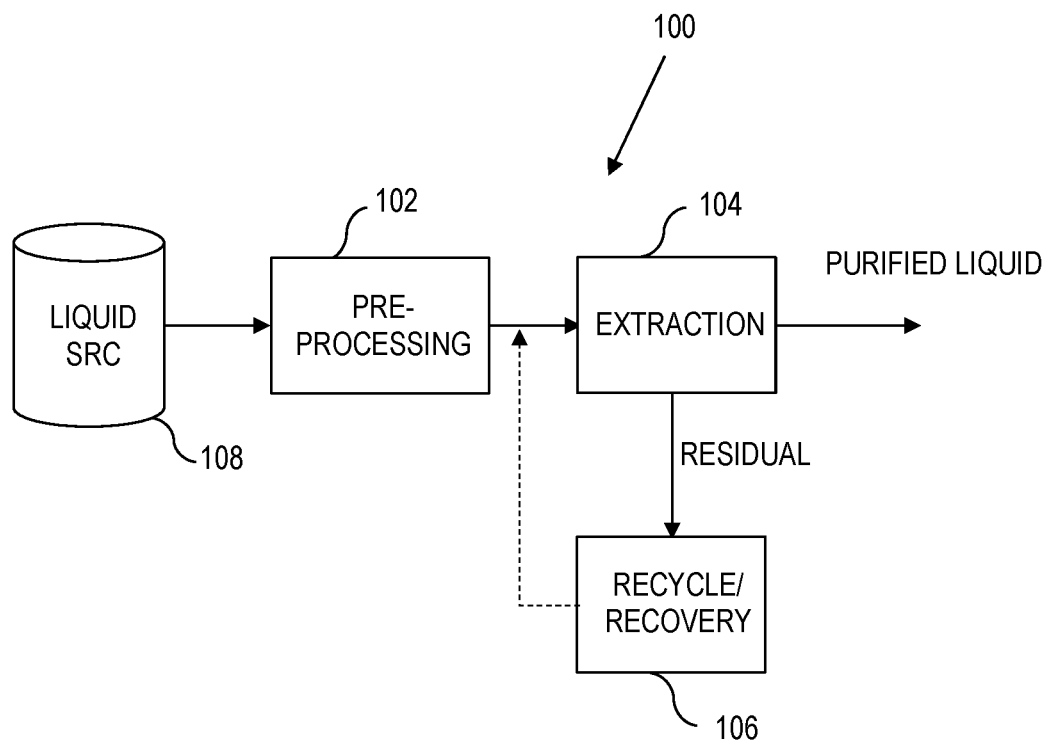
FIG. 1 is a block diagram of select processing components of a liquid-liquid extraction system, according to aspects of the present disclosure.

Referring to drawings and in particular FIG. 1, a liquid-liquid extraction system 100 is illustrated, according to aspects herein.

The liquid-liquid extraction system 100 is comprised of three primary process units, including an optional pre-process unit 102 (Process Unit 1), a Liquid-Liquid Extraction Unit 104 (Process Unit 2), and an optional extraction liquid recycle/recovery process unit 106 (Process Unit 3).

The optional pre-process unit 102 receives a source liquid, e.g., from a liquid source or liquid reservoir 108 that contains an impurity, and performs any necessary pre-processing of the liquid. The pre-process unit 102 can be omitted where not needed. Where utilized however, the pre-process unit 102 can be utilized to mix, react, process (e.g., heat, cool, etc.), scrub, filter, or otherwise treat the source liquid before entering the extraction unit 104.

By way of illustration, and not by way of limitation, in an example implementation of the oxidative desulfurization of fuel, the pre-process unit 102 can oxidize at least a portion of the source liquid comprising fuel components (including the sulfides-carrying sulfur impurities of the fuel).

The liquid-liquid extraction unit 104 can be arranged in series with the pre-process unit 102 (when provided). The liquid-liquid extraction unit 104 mixes, then separates a mixture of liquids received thereby into a raffinate (representing purified or processed liquid), and an extract, as will be discussed in detail herein. By way of introduction, keeping with the above-example of desulfurization of fuel, a source liquid could comprise an oxidized fuel that is mixed with an extraction liquid such as ethanol or an ethanol based solution. Here, the separation vessel performs phase separation to separate the oxidized fuel and the ethanol into a reduced sulfur fuel (raffinate) and an extract, where the extract is comprised of the ethanol based solution and at least a portion of the sulfur transferred from the mixed oxidized fuel. The reduced impurity fuel exits the separation vessel at a raffinate output, and the extract exits the separation vessel at an extract output.

The optional recycle/recovery process unit 106 accepts the extraction liquid from the liquid-liquid extraction unit 104. In some embodiments, the optional recycle/recovery process unit 106 can filter the extraction liquid and feed back the cleaned solution to the extraction unit 104, so as to recycle and/or re-use at least a portion of the extract.

Extraction Process Unit (EPU)

Referring generally to FIGS. 2A, 2B, 3, 4, and 5, examples are provided to explain working concepts related to the extraction unit. In order to understand various aspects herein, the extraction unit is illustrated across multiple FIGURES, each illustrating a specific characteristic to aid in the understanding of its operation.

According to certain aspects herein, the liquid-liquid extraction unit is comprised of a set of extraction "stages", where, the extraction stages collectively extract an impurity from a source liquid using an extraction liquid and/or extract.

Figure 2A:
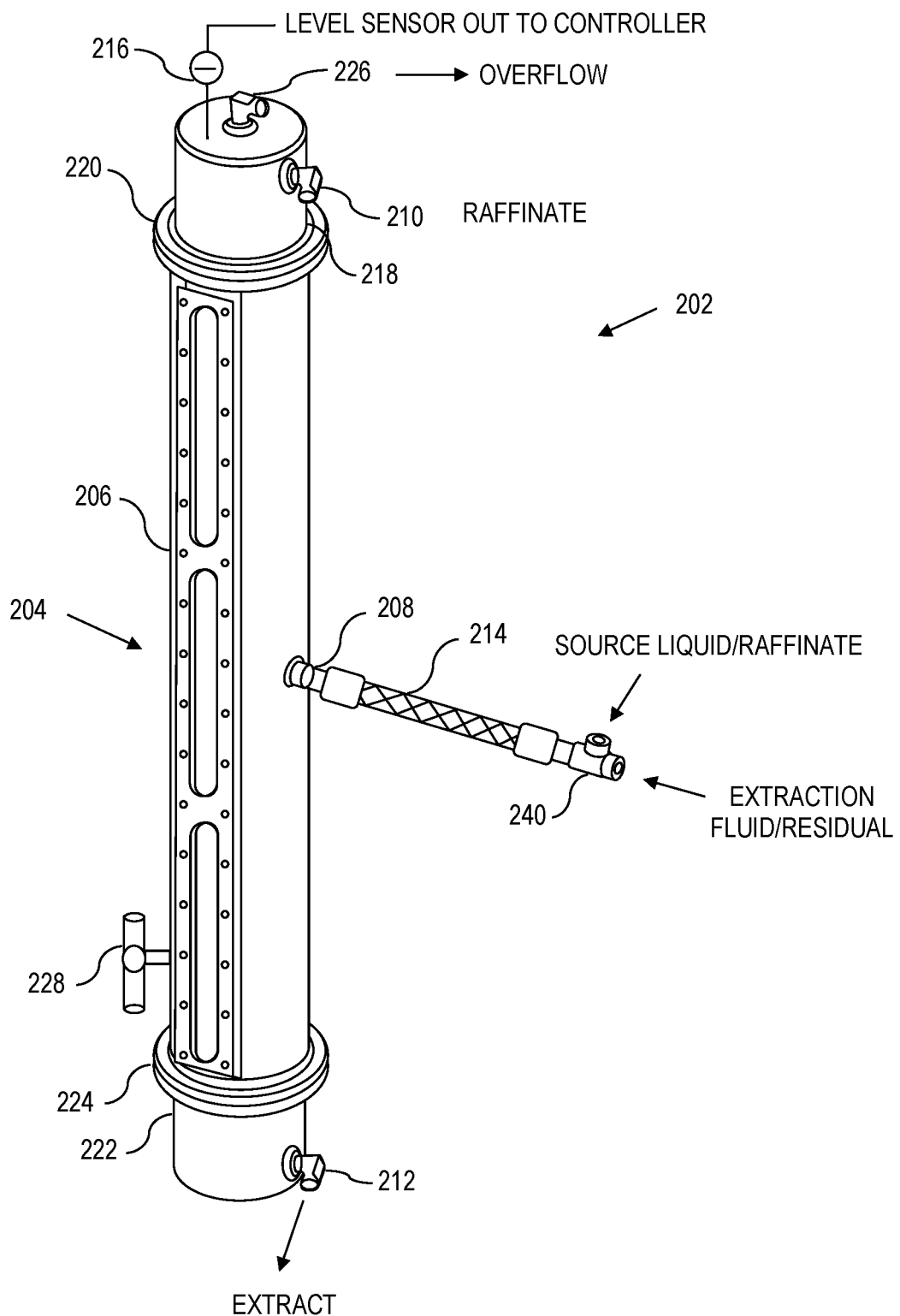
FIG. 2A is an example schematic diagram illustrating the flow of a source liquid and an extraction liquid in a multi-stage configuration.
Figure 2B:
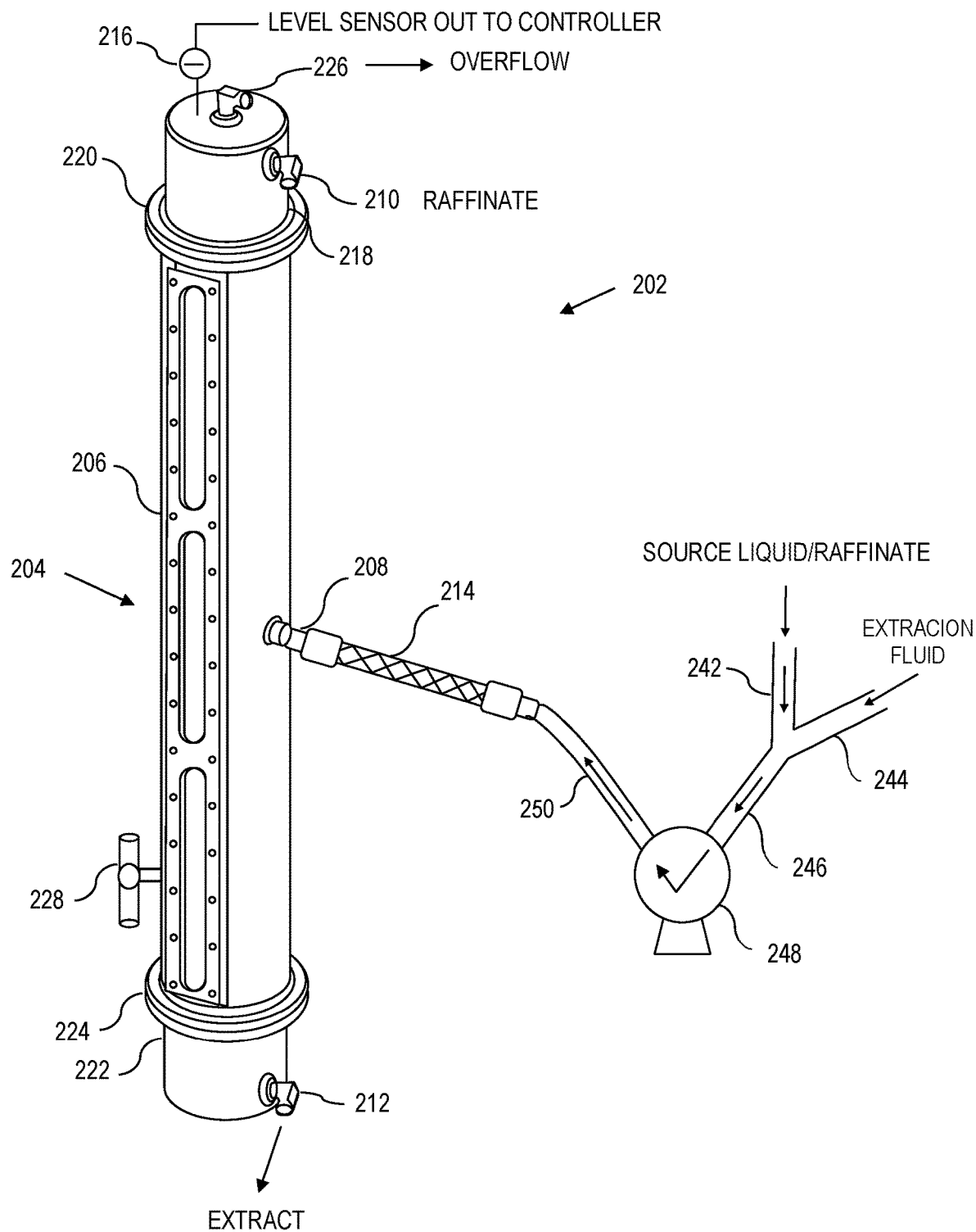
FIG. 2B is another example schematic diagram illustrating the flow of a source liquid and an extraction liquid in a multi-stage configuration.

Referring specifically to FIG. 2A and FIG. 2B, an example extraction stage 202 of an extraction unit (e.g., see extraction unit 104, FIG. 1) is illustrated, according to various aspects of the present disclosure. The illustrated extraction stage 202 omits certain details for purposes of discussion herein.

FIG. 2A and FIG. 2B each show a single extraction stage. In this regard, like structure is illustrated with like reference numbers.

In an example embodiment of a multi-stage the liquid-liquid processing unit, the extraction stage 202 can be implemented in multiple instances, connected together, e.g., in series as will be described in greater detail herein.

In an example embodiment, each extraction stage 202 implements a two-step process.

A first step includes mixing of a source liquid having an impurity, with an extraction liquid. For instance, in the example of desulfurizing fuel, an oxidized fuel is mixed with a solvent (e.g., ethanol) to transfer a solute (in this case, sulfur) from fuel to the solvent.

In a second step, phase separation is utilized to separate the source liquid from the extraction liquid.

In this example, each extraction stage 202 extracts a source liquid using an extraction liquid. To carry this out, the extraction stage 202 is comprised of a separation vessel 204 (e.g., cylindrical column). The separation vessel 204 is also generally referred to as a "tower". The separation vessel 204 generally includes a chamber 206, a primary input 208, a raffinate output 210, and an extract output 212. Liquids are introduced into the chamber 206 via a line 214.

As will be described in greater detail herein, an input liquid is presented to the chamber 206 of the separation vessel 204 via the primary input 208. The chamber 206 enables phase separation of liquid therein, into a raffinate and an extract, where the extract comprises of at least a portion of an impurity transferred from the input liquid, and the raffinate comprises liquid from the chamber having impurities drawn therefrom. The raffinate exits the separation vessel 204 at the raffinate output 210. Correspondingly, the extract exits the separation vessel 204 at the extract output 212.

In some embodiments, an optional level sensor 216 is provided. As illustrated, the level sensor 216 is coupled to the chamber 206 to measure a level of liquid and the level of the interphase (line between the two phases, light phase and heavy phase).

The input liquid is comprised of a source liquid, and an extraction liquid that are mixed together. In some embodiments, additional mixing occurs in the chamber 206. In some example embodiments, the mixing can occur using a static mixer, a pumping system, other mechanisms, combinations thereof, etc.

In some embodiments, the separation vessel 204 can be embedded with phase separator(s) to (rapidly) force the separation of liquids. Phase separators may or may not be used. However, where phase separators are used, there may be one phase separator, two phase separators, etc.

By way of example, as illustrated, a first phase separator 218 is located at an upper flange 220, and a second phase separator 222 is located at a lower flange 224 of the column. Generally, the raffinate phase separator 218 is positioned below the raffinate exit port, e.g., raffinate output 210. Under this configuration, a source liquid with lower impurity (e.g., from having a solute drawn therefrom by the extraction liquid) can exit the separation vessel 204 at the raffinate output 210, e.g., to enter a next stage in a multi-stage embodiment, or otherwise exit the process. Likewise, an extract with a higher impurity concentration can exit the separation vessel 204 at the extract output 212 to enter a next stage of extraction in the case of a multi-stage embodiment, or otherwise exit the process.

As illustrated, the separation vessel 204 can include additional, optional features, such as an optional overflow relief port 226, e.g., to drain liquid that overfills the chamber 206. In yet other alternatives, any combination of ports, valves and other configurations can be provided to control the output of the raffinate.

Yet further, the separation vessel 204 can also include additional, optional features, such as an auxiliary input to add additional extraction liquid and/or a drain output to drain excessive extraction liquid. For instance, adding additional extraction liquid, and draining excessive extraction liquid can be carried out by an optional extraction port 228.

In the above-example embodiment of an extraction stage 202, features such as valves (manual or electronically controlled) are omitted for clarity of discussion herein. However, in practice, any practical valve and flow configurations can be implemented to carry out the functions described with regard to the extraction stage 202.

Mixing (whether via the lines themselves, a pump, static mixer, etc.) is sized and designed to ensure most effective mixing of the source liquid with the extraction liquid. In this regard, the primary input 208 is illustrated as a single port that receives a mixed liquid. However, in practice, it may be possible to mix in the chamber such that the source liquid and extraction liquid each have a separate input port. In this regard, the application will dictate the mixing requirements and port configuration. In some embodiments, optimal mixing is achieved using any combination of a static mixer, pumps, mixing within the lines themselves, etc., by correct sizing and design of the lines themselves. In these configurations, the tower is only for separation of the liquids.

As an example use of the extraction stage 202, a source liquid, such as a fuel with relatively high sulfur is mixed with an extraction liquid. The mixed liquids enter the separation vessel 204. The separation vessel 204 is sized to optimize separation of the two phases. However, extraction transfer of impurities can continue to occur in the vessel as the separation happens.

For instance, in some embodiments, the light (oil) phase starts to coalesce and rise upwards to the top of the separation vessel 204. The heavy (aqueous) phase coalesces and moves downwards towards the bottom of the separation vessel 204. The separation vessel 204 is sized to allow sufficient time for effective separation of the light phase from the heavy phase which completes the transfer of impurity/solute (e.g., sulfur in this non-limiting example) from the light phase to the heavy phase.

As noted above, in some embodiments, phase separators are not strictly required. This is because gravity will eventually separate the oil phase from the aqueous phase due to difference in density. However, the use of one or more phase separator(s) can be included inside the separation vessel 204 to force a more rapid and complete phase separation, allowing higher processing rates per footprint and much higher fuel volumes.

The phase separators can be installed, for example, horizontally above the mixed phase inlet into the separation vessel and below the fuel output; and/or below the mixed phase inlet into the tower and above the extract output.

Referring specifically to FIG. 2A, in some embodiments, a source liquid and an extraction liquid mix before entering the chamber 206 via the line 214. In this regard, a fixture 240, such as a "Tee" or "Y" connector, can be utilized to mix the liquids. That is, sufficient mixing occurs in the merging of the liquids that a separate physical mixer is not required as the line 214 functions as a "static mixer" by providing a suitable travel path for the liquids to mix.

Referring now to FIG. 2B, an alternative to the configuration of FIG. 2A is illustrated for purposes of mixing a raffinate and extract. Notably, instead of the source liquid/raffinate and the extraction fluid entering the line 214, which functions as a static mixer, FIG. 2B illustrates the source liquid/raffinate entering via a first line 242. An extraction liquid enters via a second line 244. The first line 242 and the second line 244 can optionally merge via a third line 246, which directs a combined liquid to a pump 248. The pump 248 pumps the fluids via a fourth line 250 to the line 214 as per the embodiment of FIG. 2A. In some embodiments the first line 242 and second line 244 may both enter the pump 248 independently. Here, the pump 248 functions to mix the liquids. Other configurations can also be implemented.

As noted above, one or more stages can be implemented. In this regard, several factors can influence the number of required stages. For instance, processing parameters can affect the number of stages required. The volumetric ratio of source liquid to extraction liquid, and temperature can also impact the number of stages.

Example Liquid Flow

Figure 3:
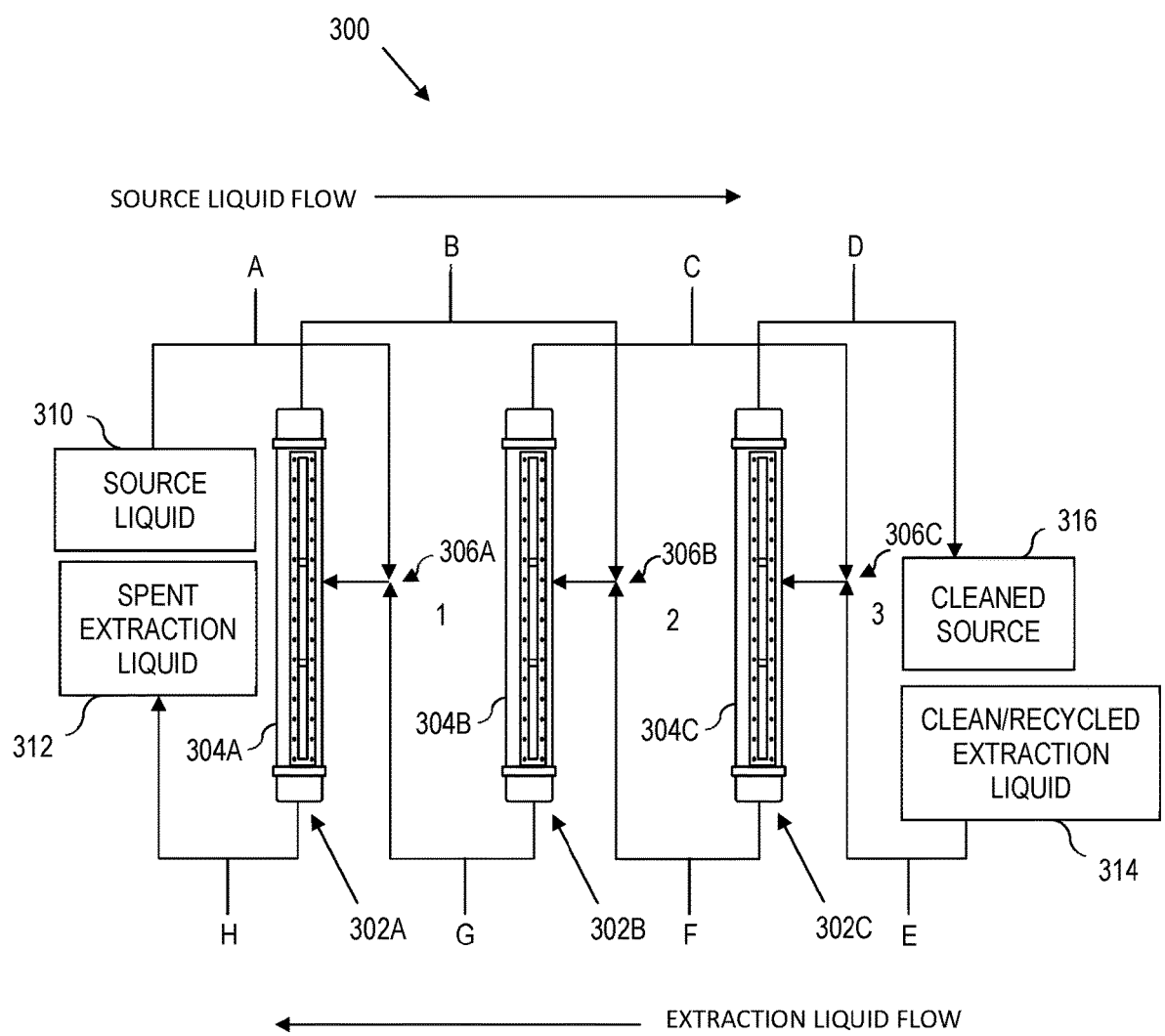
FIG. 3 is an example three-stage liquid-liquid extraction system, which can be utilized in any of other FIGURE or combination of FIGURES herein.

Referring to FIG. 3, in order to simplify the illustration of the step-by-step process, a three-stage version of an extraction system 300 is shown. However, in practice, two stages can be used, or more than three stages can be used, e.g., by cascading stages as described herein.

The example extraction system 300 is operated in "counter-flow" mode. For instance, where the source liquid moves through the system from left to right, the extraction liquid moves through the system from right to left.

As illustrated, the three-stage extraction system 300 comprise three instances of an extraction process stage 302, designated 302A, 302B, and 302C, respectively. Each extraction process stage 302 can be implemented for example, as an extraction unit 122 (FIG. 1), extraction stage 202 (FIG. 2A, FIG. 2B), etc.

In this example embodiment, each extraction stage 302 comprises a separation vessel 304 (e.g., 304A, 304B, 304C). The primary input (e.g., analogous to primary input 208, FIG. 2A, FIG. 2B) is coupled to a line set 306 (e.g., 306A, 306B, 306C), where liquid is mixed.

In the three stage extraction unit, a source liquid is pumped from a source, such as a tank or reservoir 310 through line "A" and is injected into the line set 306A at point "1" where the source liquid meets an extract (e.g., solvent, used extraction liquid, etc.) exiting the extraction process stage 302B, via line "G".

Both of the source liquid and extract mix at point "1" (Stage 1), to allow for effective mass transfer of the impurity-carrying molecules from source liquid to the extract.

The well-mixed liquids enter the separation vessel 304A as a combined, input liquid. Within the separation vessel 304A, the input liquid may be allowed enough time to begin to separate by gravity.

The light phase droplets begin to separate from the heavy phase, coalesce then rise to the top of the separation vessel 304A. Similarly, most of the heavy phase begins to fall to the bottom of the separation vessel 304A.

As the purified source liquid rises up in the separation vessel 304A, especially at high flow rates (less time for gravity separation), the source liquid may pull up amounts of solvent that has not yet separated. For this reason, a hydrophobic material disk or membrane can be installed just below the raffinate output to only allow the light phase to rise past it and exit from the top fuel output in line B to the next extraction stage 302B, while rejecting the extract from passing and forcing the separation.

The extract continually exits the separation vessel 304A through line "H" and is collected in a spent extraction liquid container 312, or is sent directly to storage, e.g., for recycling. Analogous to the raffinate, the extract exiting the separation vessel 304A through line H may pass through a phase separating membrane, e.g., a oleophilic material disk or membrane.

Raffinate leaving the separation vessel 304A through line B is pumped to point 2 (stage 2) where it meets the extract carried in line "F" exiting the separation vessel 304C (first from the right).

Both the raffinate (cleaner source liquid flowing from line B) and the extract (i.e., the extraction liquid pulled from extraction stage 302C via line F) mix at point "2" (Stage 2), via the line set 306B for additional and rigorous mixing required to effectively mass transfer the impurity-carrying molecules remaining in the source liquid cleaned in the first stage, to the extract.

The well-mixed liquids then enter the separation vessel 304B as an input liquid. Within the separation vessel 304B, the liquids may be allowed enough time to begin to separate by gravity.

Analogous to extraction stage 302A, the light phase droplets begin to separate from the extract in extraction stage 302B, coalesce then rise to the top of the separation vessel 304B. Similarly, most of the solvent droplets begin to fall to the bottom of the separation vessel 304B (heavier phase).

As the light phase rises up in the separation vessel 304B, especially at high flow rates (less time for gravity separation), the source liquid may again pull up considerable amounts of solvent that has not yet separated. For this reason, a hydrophobic material disk or membrane can be installed just below (upstream of) the raffinate output to only allow the cleaned source liquid to rise past the membrane and exit from the (top) raffinate output in line C to the next extraction stage, while rejecting the solvent from passing and forcing the separation. Analogously, an oleophilic material disk or membrane can be installed just above the extract output to reject raffinate from exiting the extract output.

The extract continually exits the separation vessel 304B through line "G" and is coupled to the first line set 306A as noted above.

Further raffinate leaving the separation vessel 304B through line C is pumped to point 3 (stage 3) where the raffinate meets the extraction liquid from line "E". Here, since there are only three example stages, the extraction liquid in line E is pumped from a liquid container 314 (e.g., a clean/recycled extraction liquid container).

Both the raffinate and extraction liquid mix at point "3" (Stage 3), then together they enter via the line set 306C into the third extraction stage 302C. Mixing enables effective mass transfer of the impurity-carrying molecules from raffinate to the extraction liquid.

The well-mixed liquids then enter the separation vessel 304C as an input liquid, where the liquids may be allowed enough time to begin to separate by gravity.

Cleaned source liquid, (the lighter phase) droplets begin to separate from the solvent, coalesce then rise to the top of the separation vessel 304C. Similarly, most of the solvent droplets begin to fall to the bottom of the separation vessel 304C (heavier phase).

As with the other stages, a hydrophobic material disk or membrane can be installed just below the raffinate output to only allow the raffinate to rise past it and exit from the top raffinate output in line D, while rejecting the solvent from passing and forcing the separation. Analogously, an oleophilic material disk or membrane can be installed just above the extract output to reject raffinate from exiting the extract output. The extract continually exits the separation vessel 304C through line "F" and is coupled to the line set 306B as noted above.

Notably, the "cleanest" extraction liquid cleans the last stage processing the source liquid, to ensure the least amount of contaminants in the source liquid. However, the extraction liquid is re-used, by being pumped to successive stages.

Cleaned source liquid leaving the separation vessel 304C through line D is collected as product liquid in container 316. The above-three step example can be extended to any number of stages.

Note that the described flows can operate in a continuous manner, such that liquid is constantly flowing, e.g., via a suitable pumping system (described later).

Moreover, mixing can occur using any suitable means to mix the raffinate with the extract. For instance, a dedicated mixer can be used, e.g., a mixer point 1 of stage 1, point 2 of stage 2, and point 3 of stage 3. As another example, the lines themselves can be used to effectively perform the mixing operations. For instance, mixing may be carried out by joining the raffinate and extract lines using a "Tee" or "Y" connector. For instance, a first "Y" connector can be used at point 1 to mix the liquid in line A with the liquid in line G;

a second "Y" connector can be used at point 2 to mix the liquid from line B with the liquid from line F; and a third "Y" connector can be used to mix the liquid from line C with the liquid from line E. Mixing can be controlled passively, for instance, by selecting line inside diameter. In other embodiments, active control can be carried out using a suitable pumping control scheme.

Process Control System

Figure 4:
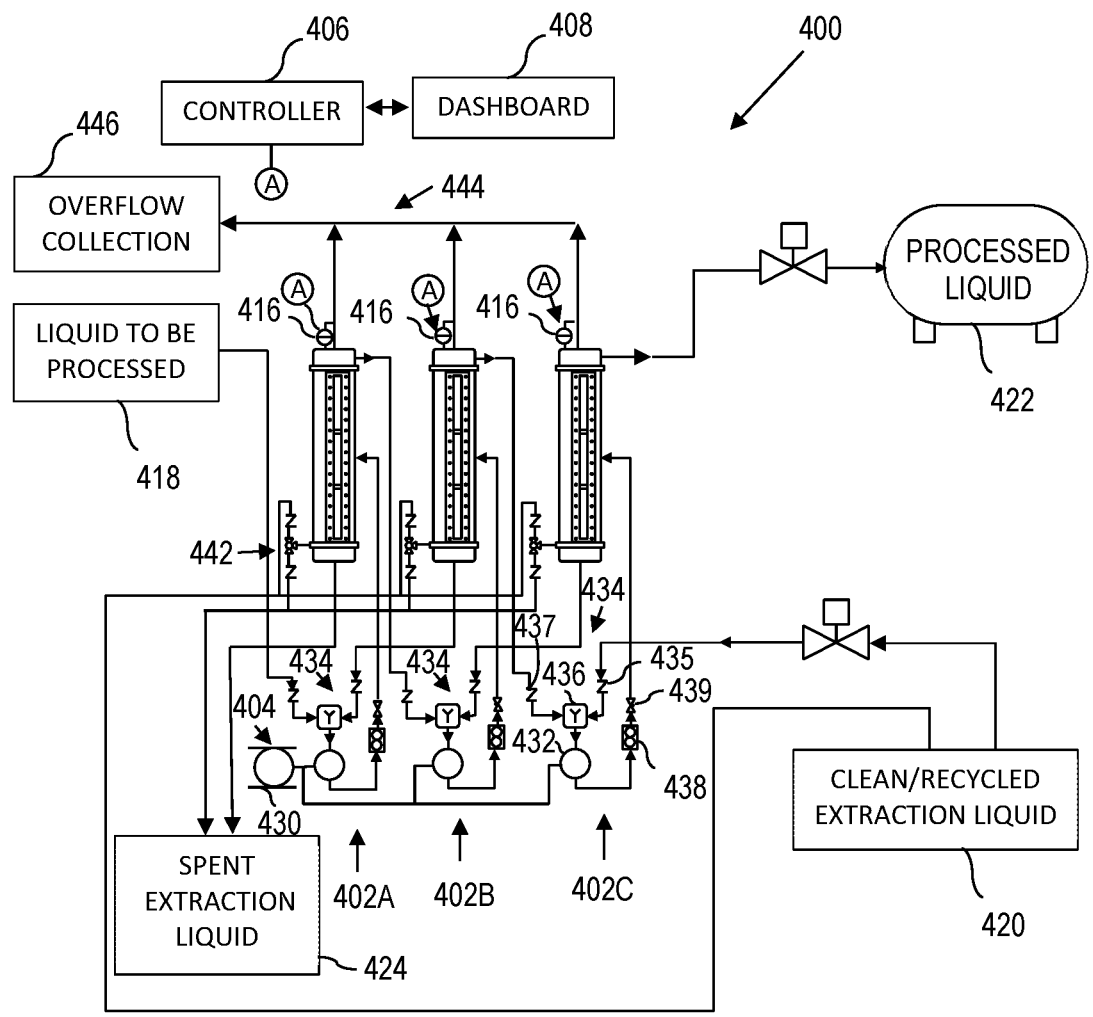
FIG. 4 is an example three-stage liquid-liquid extraction system, which can be utilized in any of other FIGURE or combination of FIGURES herein.

Referring to FIG. 4, a process control diagram is illustrated for a liquid-liquid extraction system 400 according to aspects herein. Analogous to that described earlier, the liquid-liquid extraction system 400 includes three extraction stages, 402A, 402B, and 402C.

The process control diagram also illustrates a pumping system 404, and a controller 406. The controller 406 is coupled to a dashboard 408 so that an operator can visually (e.g., via a suitable graphical user interface) monitor operation of the liquid-liquid extraction system 400. In this regard, the controller processes an at least one algorithm, as set out herein.

Analogous to that described more fully herein, the extraction stages 402A, 402B, 402C collectively extract a source liquid using an extraction liquid. Each extraction stage comprises a separation vessel having a chamber, a primary input, a raffinate output, and an extract output (e.g., analogous to FIG. 2A). At each stage, an input liquid is presented to the chamber via the primary input. As described with reference to FIG. 3, the chamber enables phase separation of liquid therein, into a raffinate and an extract, where the extract is comprised of at least a portion of an impurity transferred from the input liquid, and the raffinate comprises liquid from the chamber having impurities drawn therefrom. The raffinate exits the separation vessel at the raffinate output. Likewise, the extract exits the separation vessel at the extract output.

Analogous to the level sensor 216 (FIG. 2A), each extraction stage 402A, 402B, 402C is substantially identical, and includes a level sensor coupled to the associated chamber to measure a level of liquid and the level of the interphase between the two liquid phases therein. Only one level sensor is labeled, but each extraction stage 402A, 402B, 402C includes a level sensor 416. Each level sensor 416 is coupled, e.g., via suitable communication line(s) to the controller 406. For sake of clarity of illustration, the "circle A" represents a common electrical/communication coupling so that lines do not have to cross in the illustration.

For each extraction stage 402A, 402B, 402C, the controller 406 couples to each level sensor 416 to regulate the level of liquid and the level of the interphase between the two liquid phases in the associated chamber. In an example configuration, the controller 406 is operatively programmed to control a phase of liquid and the level of the interphase between the two liquid phases in each chamber by processing instructions to read an output of the corresponding level sensor 416. The controller 406 further processes instructions to compare the output of the corresponding level sensor 416 to a target. The controller 406 is programmed to cause the associated chamber to receive additional liquid to raise the liquid level in the chamber if the output is lower than the target, and causes the associated chamber to drain liquid to lower the liquid level in the chamber if the output is higher than the target.

The pumping system 404 pumps a source liquid from a source liquid reservoir 418, and to pump an extraction liquid from an extraction liquid reservoir 420 in a continuous manner, in counterflow directions. That is, for the source liquid, the flow is left to right in the illustration, with source liquid flowing from the source liquid reservoir 418 to the extraction stage 402A, as raffinate from the extraction stage 402A to extraction stage 402B, and as raffinate from the extraction stage 402B to extraction stage 402C in an downstream manner (relative to the flow of source liquid). Final cleaned liquid is collected into a clean liquid reservoir 422.

At the same time, the extraction liquid is pumped right to left in the illustration, with extraction liquid flowing from the extraction liquid reservoir 420 to the extraction stage 402C, as extract from the extraction stage 402C to extraction stage 402B, and as extract from the extraction stage 402B to extraction stage 402A in a downstream manner (relative to the flow of extraction liquid). Final used extraction liquid/extract is collected into a collection/recycle reservoir 424.

In some embodiments, the controller 406 controls the pumping system 404 to carry out the flows described above. In some embodiments, the pumping system 404 operates autonomously without strict control of the controller 406. That is, the pumping system 404 runs independently of control operations initiated by the controller 406.

As noted above, the pumping system 404 pumps the source liquid and extraction liquid through the system. In some embodiments, the pumping system 404 is coupled to the controller 406 for control thereof. In other embodiments, the pumping system 404 operates independently of the controller 406, e.g., depending upon the sophistication of the controller 406 and the adjustability of the pumping system 404.

Regardless, in the illustrated embodiment, the pumping system 404 includes a pumping station, illustrated by the motor 430 that controls a set of pumpheads 432 (only one pumphead 432 labeled for sake of clarity). In practice, there can be a single pumphead 432 for each extraction stage 402A, 402B, 402C. As another example, there can be a single pumphead 432 at each extraction stage 402A, 402B, 402C for pumping the source liquid and a single pumphead 432 at each extraction stage 402A, 402B, 402C for pumping the extract. As illustrated, since the pumphead 432 is schematically downstream of the mixing point of the source liquid/raffinate and the extraction liquid/extract, only a single pumphead 432 per extraction stage 402A, 402B, 402C is required. However, in some embodiments, other combinations of pumps and pumpheads are implemented, e.g., depending upon the liquids, extraction stage configuration, and process requirements.

In an example embodiment, at each extraction stage 402A, 402B, 402C, the controller 406 controls the fixtures 434 leading to the primary input of a corresponding extraction stage 402A, 402B, 402C. In other embodiments, the fixtures can be manually controlled, or there can be a mix of manual and automatically controlled fixtures. Regardless, the fixtures 434 include a valve 435 (schematically represented by the Z—representing a check valve in this example) from the extraction liquid reservoir 420/from the extract output of a preceding stage. Also, a mixer 436 is illustrated. This is for schematic purposes only, and does not require a physical, discrete mixer. Rather, the pump pulling the liquid through the tubing may suitably mix the source liquid and extraction liquid into a suitably mixed input liquid. The fixtures 434 can also include other devices, such as a valve 437 (schematically represented by the Z) from the liquid to be processed 418 from the raffinate output of a preceding stage. The fixtures 434 can further include a flow meter 438 (box with two stacked circles) downstream of the pumphead 432, a valve 439 upstream or downstream of the flow meter 438, etc.

In an ideal implementation, the pumping station 430 and multiple pumphead 432 configuration should result in continuous and consistent flow of liquid such that each extraction stage 402A, 402B, 402C receives the ideal and identical levels of liquid. However, it is possible that due to mechanical tolerances and other issues, that the extraction stage 402A, 402B, 402C become unbalanced. In this situation, the controller 406 can balance out the individual extraction stages 402A, 402B, 402C. In the illustrated example, each extraction stage 402A, 402B, 402C has an auxiliary input and a drain output, e.g., each of which share a common port to the chamber. A valve regulation system 442 is coupled to the controller 406. The controller 406 normally keeps all valves of the valve regulation system 442 closed such that the pumping system 404 controls flow.

However, as noted above, the controller 406 is coupled to each level sensor 416. Moreover, the controller 406 is operatively programmed to control a phase of liquid in each chamber by processing instructions to read an output of the corresponding level sensor and compare the output of the corresponding level sensor to a target. Here, the target can be defined as a range of acceptable level within a corresponding chamber, a threshold, a range of thresholds, etc. Thus, the target may be a single value, a range of values, etc.

By way of example, a target range can be selected so that the raffinate drawn from the raffinate output includes cleaned source liquid, at a rate consistent with the flow rate of the pumping system 404. As another example, the target range can be set based upon identifying a phase, e.g., identifying that raffinate is light phase and extraction liquid is heavy phase.

In an example implementation, the controller 406 causes the associated chamber to receive additional liquid to raise the liquid level (e.g., the liquid level or the interphase level, whichever is needed) in the chamber if the output is lower than the target. For instance, a valve of the valve regulation system 442 can be opened, e.g., schematically illustrated as the top valve (shown as a Z—e.g., check valve, but in practice, the valve could be a check valve, hand valve, or other valve configuration) to allow clean extraction liquid, which may be pumped from the extraction liquid reservoir 420 into a particular chamber that is low on liquid contents. In some embodiments, the controller 406 can open a valve associated with the auxiliary input of the associated stage to allow extraction liquid to begin filling the overall level in an associated chamber. In other embodiments, the controller 406 can trigger a workflow, e.g., to cause an operator to open a hand valve, etc.

In yet still other embodiments, instead of using an extraction fluid to move the liquid and interphase level up, the clean product (e.g., cleaned source liquid) can also be used to raise the level of the liquid to the raffinate exit outlet.

Analogously, in some embodiments, the controller 406 is programmed to cause an associated chamber to drain liquid to lower the liquid level or interphase level in the chamber if the output is higher than the target. For instance, a valve of the valve regulation system 442 can be opened, e.g., schematically illustrated as the bottom valve (shown as a Z) to allow fluid near the bottom of the chamber to drain into the collection/recycle reservoir 424. Analogous to that described above, the controller 406 can control the valve directly, or the controller 406 can issue an instruction to have the valve operated, e.g., by operating a hand valve, etc.

Aspects herein can also provide an interface level control (e.g., a shut off valve) for raffinate. For instance, in some embodiments, a raffinate output can be equipped with a valve (manual or electronically controlled). Under this configuration, the valve is closed when not enough raffinate is present in a corresponding tower. If the valve remained open, air could be pulled into the pumphead and transferred to the next stage. This could disrupt flow rates and phase separation.

The system also includes an overflow/venting line 444. If a stage becomes too full, the line redirects excess fluid to an overflow collection reservoir 446. In an example implementation, liquid from an associated extraction stage may be able to exit to an overflow vessel, e.g., overflow collection reservoir 446, via an unrestricted line. This is schematically illustrated in FIG. 4 by the vertical arrows exiting the upper flange of each extraction stage to the an overflow/venting line 444.

This aspect of the system may not be required, but does provide a means to handle unexpected situations where too much liquid moves through the system too quickly.

The dashboard 408 can provide a real-time view of the stage of each stage, show levels, purification, quantity of each liquid, or other suitable metrics to monitor and control operation thereof.

In some embodiments, the dashboard can also provide a graphical user interface that allows an operator to override valve states, control flow, setup the system for operation, generate reports, or otherwise interact with the system.

In practice, the controller 406 allows the incorporation of automation, including valves, flow rate modifiers, pump control logic, etc. The controller 406 also allows the system to incorporate any number of sensors, including level sensors, flow rate sensors, particle counters, and other sensors necessary in order to process the source liquid to a desired output liquid.

The extract output from each tower can be equipped with a valve. Such a valve can be regulated to adjust the ratio between extract and raffinate. In addition, the raffinate and extract outputs can each be equipped with flow meters (analog or digital) to determine the actual flow rates and their relative ratio.

In some embodiments, the liquid-liquid extraction can operate under several pressure conditions including atmospheric, vacuum or high pressure. The operating pressure can be maintained in the multistage system through the overflow lines and overflow collector. Each tower is directly connected with the overflow collector with a dedicate overflow line (star network). For operations at atmospheric pressure, the overflow collector is properly vented to the ambient to allow additional air, or relive pressure. For vacuum operations, the overflow collector can be connected to a vacuum pump or vacuum station to proper maintain nominal pressure. Finally, high pressure operation would require a pressurized gas source connected to the overflow collector to maintain nominal pressure as well as a pressure relief valve to reduce any occurrence of pressure higher than nominal.

Additional Example Algorithms

The controller controls the overall liquid level, and interphase (line between the two phases, light phase and heavy phase) in the extraction stages to ensure that under continuous operating conditions, the light phase is continually pushed out of a raffinate output (e.g., an output at the top of the extraction stage) of a corresponding extraction stage at rate close to a target flow rate. Moreover, the heavy phase is pulled at a desired rate (e.g., a desired target flow rate) from an extract output (e.g., an output at the bottom of the extraction stage) of each corresponding extraction stage to move to the next extraction stage.

When the level sensor detects that the source liquid level is below the source liquid exit point (source liquid would not be leaving the extraction stage), the level sensor sends a signal to the controller. Alternatively, the controller can receive a signal from the level sensor, e.g., by polling, asynchronous communication, etc. Regardless, the controller closes the valve on the source liquid exit line, so that the pump does not pull air (instead of source liquid) and cause flow issues and turbulence. In that case the pump only pulls extraction liquid from the previous extraction stage. The controller also opens the "fill valve" on the bottom of the extraction stage to let extraction liquid in to raise the source liquid level above the source liquid exit point so that source liquid continues to flow out of that port.

When the level sensor detects that the interphase is above the source liquid exit point (extraction liquid not the source liquid would be leaving from the source liquid exit port), the level sensor sends a signal to the controller. Again, in other embodiments, the controller receives a signal from the level sensor. Regardless, the controller closes the valve on the source liquid exit line, so that the extraction liquid does not go into the source liquid line and changes the volumetric ratios of source liquid to extraction liquid. The controller also opens the "drain valve" on the bottom of the extraction stage to let extraction liquid out of the extraction stage and lowering the source liquid level to (or below) the source liquid exit point so that the source liquid continues to flow out of that port.

When the separation vessel does not have any source liquid (typically at startup but can sometimes happen during process) or the liquid in associated extraction stage is below a target (e.g., target level, target threshold, target range, etc.), the level sensor sends a signal to the controller (or the controller otherwise reads a signal from the level sensor) to close the valve on the source liquid exit line.

When level sensor detects that the liquid height in the extraction stage is too high and that it is going over to the over shoot vessel (or when the controller determines based upon a signal from the level sensor that the level is too high), the controller opens the drain valve on the bottom of the extraction stage to let the extraction liquid out to lower the liquid height in the system to the target, or otherwise in range of target bounds, threshold, etc.

As another example, a controller of a liquid-liquid extraction system can be operatively programmed to receive a signal from each level sensor, and when a level sensor of an associated extraction stage indicates that a level of liquid in an associated extraction stage is below a first threshold, the controller closes a valve on the raffinate output until the liquid in the associated extraction stage reaches a predefined target.

The controller may also be operatively programmed to receive a signal from each level sensor, and when a level sensor of an associated extraction stage indicates that a level of liquid in an associated extraction stage is above a first threshold, the controller opens a drain valve on the associated extraction stage to let extraction liquid out of the associated extraction stage to lower a liquid level when the associated level sensor detects that a liquid height in the associated extraction stage is above a second threshold. In some embodiments, the second threshold is exceeded when liquid from the associated extraction stage exits to an overflow vessel via an unrestricted line.

EXAMPLES

According to some embodiments, a liquid-liquid extraction system includes a controller that is operatively programmed to receive a signal from each level sensor. When a level sensor of an associated extraction stage indicates that a liquid level within the associated extraction stage is below the raffinate output, the controller closes a valve on the raffinate output so that the pumping system only pulls extraction liquid from the previous extraction stage, and opens a fill valve of the associated extraction stage to let extraction liquid into the associated extraction stage to raise the raffinate level above the raffinate output so that raffinate flows out of the raffinate output once the valve on the raffinate output is re-opened.

As another example, according to some embodiments, a liquid-liquid extraction system includes a controller that is operatively programmed to receive a signal from each level sensor. When a level sensor of an associated extraction stage indicates that a liquid level within the associated extraction stage is below the raffinate output, the controller closes a valve on the raffinate output so that the pumping system only pulls extraction liquid from the previous extraction stage, and opens a fill valve the associated extraction stage to let a processed source liquid into the associated extraction stage to raise the raffinate level above the raffinate output so that raffinate flows out of the raffinate output once the valve on the raffinate output is re-opened.

As yet another example, according to some embodiments, a liquid-liquid extraction system includes a controller that is operatively programmed to receive a signal from each level sensor. When a level sensor of an associated extraction stage indicates that an interphase is above the raffinate output, the controller closes a valve on the raffinate output of the associated extraction stage so that the extraction liquid does not leave from the raffinate output and opens a drain valve on the associated extraction stage to let extraction liquid out of the associated extraction stage, lowering a liquid level to or below a liquid exit port so that the liquid continues to flow out of the liquid exit port.

Additional Examples

In an example implementation, each separation vessel further comprises an auxiliary input and a drain output as described herein. Moreover, the controller is further programmed to cause the associated chamber to receive additional liquid to raise the liquid level in the chamber if the output is lower than the target by implementing instructions to add extraction liquid to the corresponding chamber via the auxiliary input. Analogously, the controller 406 is programmed to cause the associated chamber to drain liquid to lower the liquid level in the chamber if the output is higher than the target by implementing instructions to cause the associated chamber to drain liquid via the drain output to lower the liquid level in the chamber.

The auxiliary input and the drain output can optionally share a common access to the vessel, where the function (input, output, or neither) is controlled by a valve system that is operated by the controller 406.

In some configurations, the extraction stages cascade in series. Here, the stages collectively define a first stage, a last stage and intermediate stages.

At the first stage, the source liquid mixes with the extraction liquid from a first one of the intermediate stages (second overall stage) defining the input liquid for the first stage, and the input liquid is fed in the chamber of the first stage.

At each intermediate stage, the raffinate from a previous one of the intermediate stages and the extraction liquid from a subsequent one of the intermediate stages mixes to define the input liquid for a corresponding one of the intermediate stages, and the input liquid is fed into the chamber of a corresponding one of the intermediate stages.

At the last stage, the raffinate from a last one of the intermediate stages mixes with the extraction liquid defining the input liquid for the last stage, and the input liquid is fed into the chamber of the last stage.

In some configurations, the controller 406 is further operatively programmed for feeding extraction liquid into an associated extraction stage to raise the extraction liquid by implementing instructions to open a feed valve under pressure on the associated extraction stage to raise the level of the extraction liquid, and shut the feed valve on the associated extraction stage when the level of the extraction liquid reaches a predetermined level.

Yet further, in some configurations, the controller 406 is further operatively programmed for draining extraction liquid from the associated extraction stage to lower the extraction liquid by implementing instructions to open a drain valve on the associated extraction stage to drain extraction liquid, and close the drain valve when the level of extraction liquid reaches a predetermined level.

As another illustrative example, in some embodiments, the controller is further programmed with instructions to programmably control a first valve that feeds extraction liquid to automatically cause extraction liquid to be fed into the associated extraction stage to raise the extraction liquid if the output is lower than the target, and programmably control a second valve that operates a drain to drain extraction liquid automatically from the associated extraction stage to lower the extraction liquid if the output is higher than the target.

In some configurations, the controller 406 is further programmed to cause extraction liquid to be fed into the associated extraction stage to raise the extraction liquid by sending a first message to cause an operator to manually operate a first manual valve, and cause extraction liquid to be drained from the associated extraction stage to lower the extraction liquid by sending a second message to cause an operator to manually operate a second manual valve. Thus, the valves can be automatically controlled via the controller 406, controlled manually but electronically, e.g., via an operator interacting with a graphical user interface, or the valves can be manually operated, e.g., at the physical location of the valve such as by manually operating a corresponding valve.

In some example embodiments of a liquid-liquid extraction system, the controller is further operatively programmed to feed extraction liquid into an associated extraction stage to raise the extraction liquid by implementing instructions to open a feed valve under pressure on the associated extraction stage to raise the level of the extraction liquid and close the fill valve on the associated extraction stage when the level of the extraction liquid reaches a predetermined level.

In some example embodiments of a liquid-liquid extraction system, the controller is further operatively programmed to drain extraction liquid from the associated extraction stage to lower the extraction liquid by implementing instructions to open a drain valve on the associated extraction stage to drain extraction liquid and close the drain valve when the level of extraction liquid reaches a predetermined level.

In yet a further example, a liquid-liquid extraction system includes a controller that is further programmed with instructions to programmably control a first valve that feeds extraction liquid to automatically cause extraction liquid to be fed into the associated extraction stage to raise the extraction liquid if the output is lower than a target and programmably control a second valve that operates a drain to drain extraction liquid automatically from the associated extraction stage to lower the extraction liquid if the output is higher than the target output.

Pumping System

Turning to the pumping system, in some embodiments, the pumping system comprises a pumping station that draws the source liquid from a first reservoir such that the source liquid enters a first one of the extraction stages and draws the raffinate from the first one of the extraction stages so as to cascade into a next one of the extraction stages. In some configurations, the raffinate that exits a final one of the extraction stages is a purified liquid.

Correspondingly, the pumping system can comprise a pumping station that draws the extraction liquid from a second reservoir into a last one of the extraction stages. Here, the pumping station can also draw the extraction liquid from the last one of the extraction stages so as to cascade into a preceding one of the extraction stages. In this configuration, the extraction liquid that exits a first one of the extraction stages is collected into a third reservoir.

In some embodiments, the source liquid and/or the extraction liquid could potentially be pumped using external/stand alone pumps. Once they are in the system the multihead pumping system moves them from one tower to the next. For instance, in some embodiments, each extraction stage has a corresponding pumphead, each pumphead driven to cause flow of the raffinate, the extract, or both for the corresponding extraction stage, wherein a pumping action mixes the raffinate and the extraction liquid before entering each extraction stage without the need for a separate mixer.

In some embodiments, a motion/power transmission system couples the motor with the pumping station, linking all the shafts driving the pump heads using any combination of pulleys and belts, friction gears, gear assembly, sprockets wheels and chains or wheel, worm gears, etc. As another example, a motion transmission mechanism couples the corresponding pump to each pumphead via a pulley, sprocket, gear system or combination thereof. In an example implementation, each stage has a corresponding pumphead, each pumphead is driven by a corresponding shaft or drive system, wherein each pumphead causes flow of both the raffinate and the extract for the corresponding stage. Depending upon the implementation, the pumping action caused by the pumphead mixes the raffinate and the extraction liquid without the need for a separate mixer.

In some configurations, a chain-drive system can be utilized to couple the pumpheads to a common source. As a few other examples, a pulley and gear drive system ca be utilized to drive each of the pumpheads.

As noted more fully herein, in some configurations, the controller 406 can control the pumping system 404. In other embodiments, the controller 406 controls the level according to the target in each vessel as described more fully herein, but the controller 406 operates independently of the pumping system 404. In this configuration, the pumping system can attempt to control the flow such that there is equal flow from one stage to the next. However, the controller 406 will correct any variances that occur. Here, flow and/or mixing can be controlled by factors such as pipe diameter (which need not be the same between the raffinate and the extract), pump speed, setting of valves, etc. In this regard, a physical static mixer may not be required.

Example Multi-Stage Portable Extraction System

Figure 5:
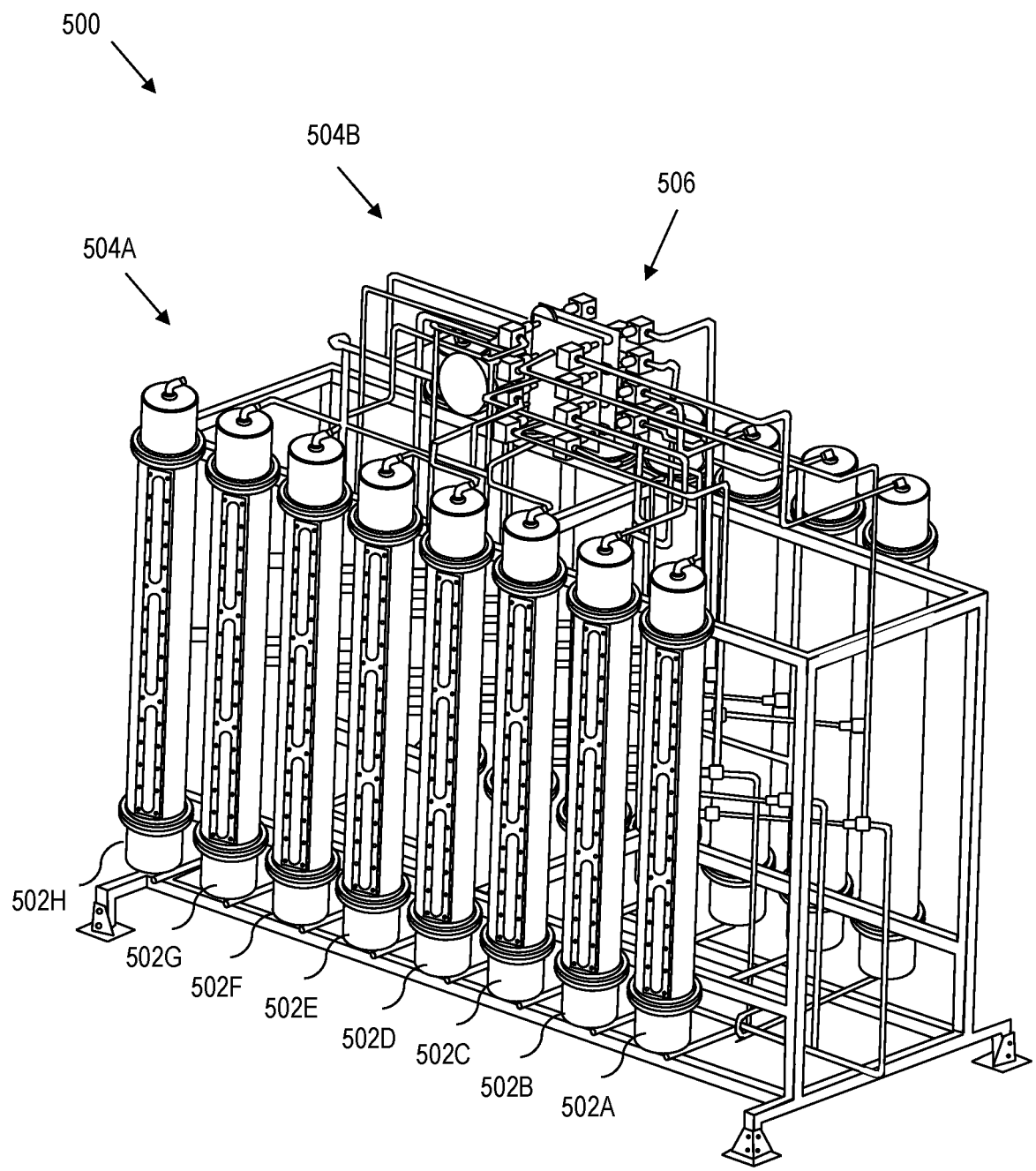
FIG. 5 is an example sixteen-stage liquid-liquid extraction system, which can be utilized in the system of any of other FIGURE or combination of FIGURES herein.

Referring briefly to FIG. 5, an example sixteen-stage extraction system 500 is illustrated. The sixteen-stage version works analogously to the three-stage version described herein. However, the processing is extended out by the corresponding number of stages (i.e., from three stages to 16 stages.

The system 500 includes sixteen extraction process stages 502, which can be implemented in a manner that is analogous to the extraction stages described above. For instance, each stage can be implemented as an extraction unit 122 (FIG. 1), extraction stage 202 (FIG. 2), an extraction process stage 302 (FIG. 3), an extraction process stage 402 (FIG. 4), or a combination thereof. As such, the operation of each stage incorporates by reference, the preceding disclosure.

As illustrated, the system 500 is implemented as two "banks", including a first bank 504A and a second bank 504B. Each "bank" organizes eight extraction process stages 502 each.

Each bank is analogous, so only the first bank 504A of extraction process stages 502 is labeled. See stages 502A, 502B, 502C, 502D, 502E, 502F, 502G, and 502H.

Moreover, the system 500 illustrates a pump system 506. The pump system 506 controls the flow through the various extraction process stages 502, and can be implemented by any combination of controls, motors, pumps, valving, etc. Examples that can be utilized with the system 500 are described in greater detail here in any combination thereof. See also, the pumping system 404 described with reference to FIG. 4.

Thus, in some embodiments, the liquid-liquid extractor can be made up of separate (multiple) extraction stages. One or more of the extraction stages can have one or more phase separators. Configuring the vessels as separate units allows the phase separation to occur away from the phase mixing, e.g., to ensure complete phase separation. Also, configuring the vessels as separate units allows mixing to be performed outside the vessel, e.g., to ensure optimal and effective mixing. Also, in some embodiments, the system can exhibit a counter flow of fuel and extraction solvent in the stages.

Depending upon the application, extraction may work effectively over a wide range of operating conditions. For instance, in the context of desulfurization of fuel, extraction may work effectively over a wide range of indoor and outdoor ambient temperatures, requiring no heating, no cooling, no enclosure, etc. Fast processing rates per square foot and/or small footprint can be realized, and, aspects herein are not limited by gravity separation.

In some embodiments, without hydrophobic phase separators, the separation step in the liquid-liquid extractor may only be achieved as long as the liquid velocity is below the "flooding velocity" (velocity at which liquid-liquid separation is not achieved, e.g., both phases may spray out the top of the column). The flooding velocity (velocity at which entrainment occurs) in a conventional extraction vessel, without a phase separator, may be, for example, an order of magnitude lower than it is if a Hydrophobic./Oleophillic membrane, is installed therein. Thus, in some embodiments, including the phase separating membrane or other form of phase separators (hydrophobic/oleophillic, or oleophobic/hydrophillic, or both), the liquid-liquid exchange herein can process significantly increased amounts of liquid, e.g., at least 5 times the amount of liquid in some embodiments, that could be processed without a corresponding membrane in the same size system, at the same conditions, without any additional modifications. The ability of processing at high liquid velocities enables the system to process large volumes of fuel with a small footprint.

When used for desulfurization, the extraction functions well over a wide range of temperatures, e.g., from −20 degrees Fahrenheit to 125 degrees Fahrenheit (approximately −28.8 to 51.7 degrees Celsius). Other liquids may dictate other ranges.

Moreover, by modifying the temperature, or both, processing and processing efficiency can be modified. For instance, by increasing pressure, temperature, or both, the number of stages may be reduced to achieve an equivalent impurity reduction. In this regard, processing conditions can be controlled based upon desired cleaning results.

The disclosed liquid-liquid extractor can be implemented via a simple and compact design, and is thus ideal for mobility and transportability. Moreover, as illustrated above, some embodiments are modular and scalable.

Moreover, example liquid-liquid extractors can work on minimal energy requirements, operate at room temperature and pressure, with no exotic materials, and no need for ionic liquids as an extract.

The raffinate leaving the process (after all stages) might still have residual extraction liquid in it, and it might require additional separation before storage/usage. This can be accomplished using a holding tank for separation by gravity, a coalescer, a hydrophobic membrane or phase separator or if required, a continuous centrifuge or any other suitable method of separation of solvent traces that would not compromise the quality of the product. Analogously, the extraction liquid leaving the process (after all stages) might still have residual raffinate in it, and it might require additional separation. This can be accomplished using a holding tank for separation by gravity, or, if required, a continuous centrifuge or other suitable method of separation that would allow the raffinate recovery without compromising its quality.

Multi-Head Pumping System

Chemical and physical processes can consist of multiple process steps, requiring multiple process units arranged in series. Additionally, some processes require multiple stages per unit to increase the process efficiency and further refine the product. Examples of multistage processes include filtration, flash distillation, multistage extraction and more. In order to ensure accuracy in delivering equal flow rate in and out each process unit or stage, one (feed), two (feed and discharge) pumps, etc., can be utilized. Moreover, process instrumentation can be utilized to control the flow in and out of the process units or stages. Examples of instrumentation used to control flow include flow sensors, flow meters, valves, pressure regulators, etc. Typically, more than one instrument is combined in series to control a process unit.

Adding instruments to each process unit (or to each stage) adds significant procurement cost, operational complexity, maintenance cost, calibration requirement, and repair downtime. It also requires having spare parts. However, according to aspects herein, a single pumping station can be provided, that can serve more than one process unit or the needs of a process unit that has multiple stages (or multistage), while ensuring equal flow rates in all lines.

In some embodiments, the pumping system is implemented as a multi-head pumping unit that controls the flow in between the extraction stages. For instance, a multi-head pumping unit can be utilized to feed an input liquid and an extraction liquid into the liquid-liquid extraction unit, as described more fully herein.

In some embodiments, the pumping system works in tandem with the control system to provide an automated (or even fully automated) system. In this regard, the pumping system and the control system can interact, or the pumping system and the control system can each operate independently. In yet further configurations, the pumping system is agnostic to the control system, but the control system reacts to flows through the liquid-liquid extraction unit, as described more fully herein. In this regard, aspects of the pumping system are independent and can form the basis of claims specifically thereto.

In some embodiments, the pumping system is utilized to service an entire chemical process (more than one unit operation), e.g., in an industrial setting.

In some embodiments, the pumping system mixes two or more inputs, which can comprise any combinations of liquid or gas. For instance, the pumping system may be used to mix two liquids, a liquid and a gas, etc. In an application where such a pumping system is used in conjunction with the liquid-liquid extraction stage, the gas here would be in place of the light phase.

As yet another example, a pumping system can comprise a multi-head configuration where each pumphead has a suction and discharge. Here, the suction and discharge side can be directed in any practical manner. For instance, pump heads in the pumping system could be pulling from different feed source and discharging to different output vessels or combination of both.

The same concept of a multi-head pumping station can also be applied to gas compressors. Here, the pump heads are replaced with gas compressors and do the same with gas or air. Moreover, the same concept of multihead pumping system can be used with various types of pumps that handle different types of media including: sludge, slurry, etc. Examples of such include positive displacement, rotary, rotary positive displacement, a gear pump, a screw pump, a velocity pump, a radial flow pump, an axial flow pump, etc.

Example Configurations

Figure 6:
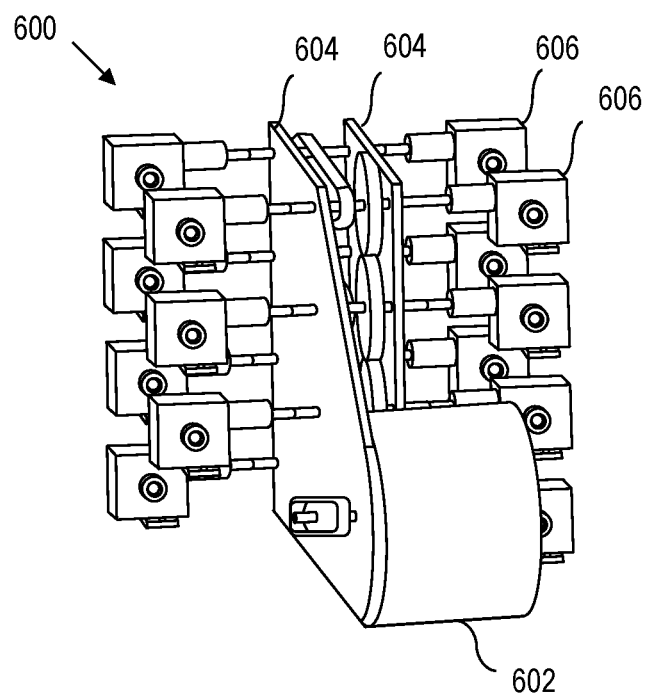
FIG. 6 is an illustration of certain aspects of a multi-head pumping system, which can be utilized in the system of any of other FIGURE or combination of FIGURES herein.
Figures 7A, 7B:
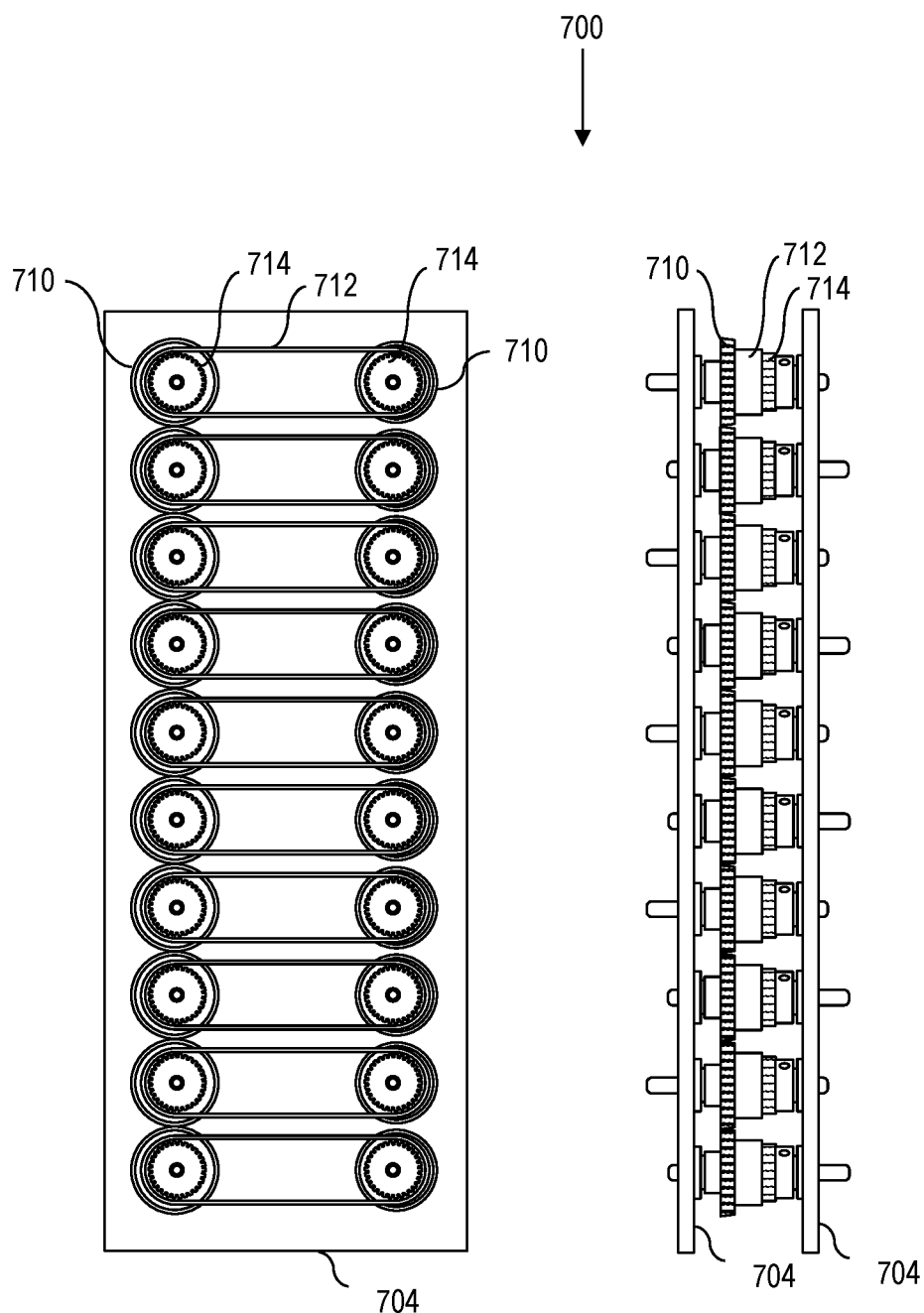
FIG. 7A is an illustration of additional aspects of a multi-head pumping system, which can function as part of a liquid-liquid extraction system, according to aspects of the present disclosure.
FIG. 7B is a side view of the aspects of FIG. 7A, according to aspects of the present disclosure.

Referring generally to FIG. 6, FIG. 7A, and FIG. 7B, a pumping system is illustrated in greater detail.

Referring initially to FIG. 6, a pumping system 600 can be used with any combination of features described herein. The example pumping system 600 is comprised of a one large motor 602, a power transmission system 604, which is used to power multiple pumpheads 606. In an example configuration, an assembly of multiple pumpheads 606 is driven by a motor 602 that is coupled to the power/motion transmission system 604 (implemented as a gearbox, belt and pulleys, chain and sprockets, etc.), which transmits power mechanically from shaft to shaft, so as to provide consistent, equal flow from one extraction stage to the next extraction stage. That is, the motor 602 drives multiple pumpheads 606 for equal flow from one extraction tower (extraction stage) to the next. In an example embodiment, the number of utilized pump heads is equal to the number of required extraction stages.

In an example implementation, a gearbox has a number of gears that is at a minimum, equal to the number of shafts required for the process of interest. As another example, a system of belts/pulleys can alternatively be implemented. In example embodiments, all gears, belts, pulleys, etc., can be of the same size and may be identical, or the components can be different, each configured to suit the desired application. As an example gears could be different in size and number of teeth. The gearbox transmits the motor shaft power to all peripheral shafts, at same rotational speed and direction. Each peripheral shaft carries a rotary pump head 606 that rotates at the same rotational speed and direction. The gearbox is configured as required by the most suitable configuration for the application. For instance, every gear can be interconnected with a following gear to transfer the shaft work.

In some embodiments, pumpheads can be connected to the gearbox using quick release shaft couplings or two-piece couplings in order to isolate the pumpheads from the rest of the power transmission system, e.g., depending upon application requirements.

In some embodiments, the motor can be driven using a variable frequency drive (VFD) to control the speed (RPM). VFD could be remotely controlled by the control system.

Referring generally to FIG. 7A and FIG. 7B, an example of a motion or power transmission system is illustrated. The power transmission system can implement the power transmission system 604 (FIG. 6). As illustrated, the example power transmission system includes gears 710, belts 712 and pulleys 714, or any combination thereof. For instance, as illustrated, the example power transmission system includes pulleys 714 and belts 712, which are used to transfer shaft work in each row between two gears 710. Shafts can be made available on two faces of a pulley box 704 in order to maintain same rotational direction.

In yet another example embodiment, a power transmission system utilizes chains and sprockets to transfer the power from the motor to the shafts to rotate the pump heads.

Figure 8:
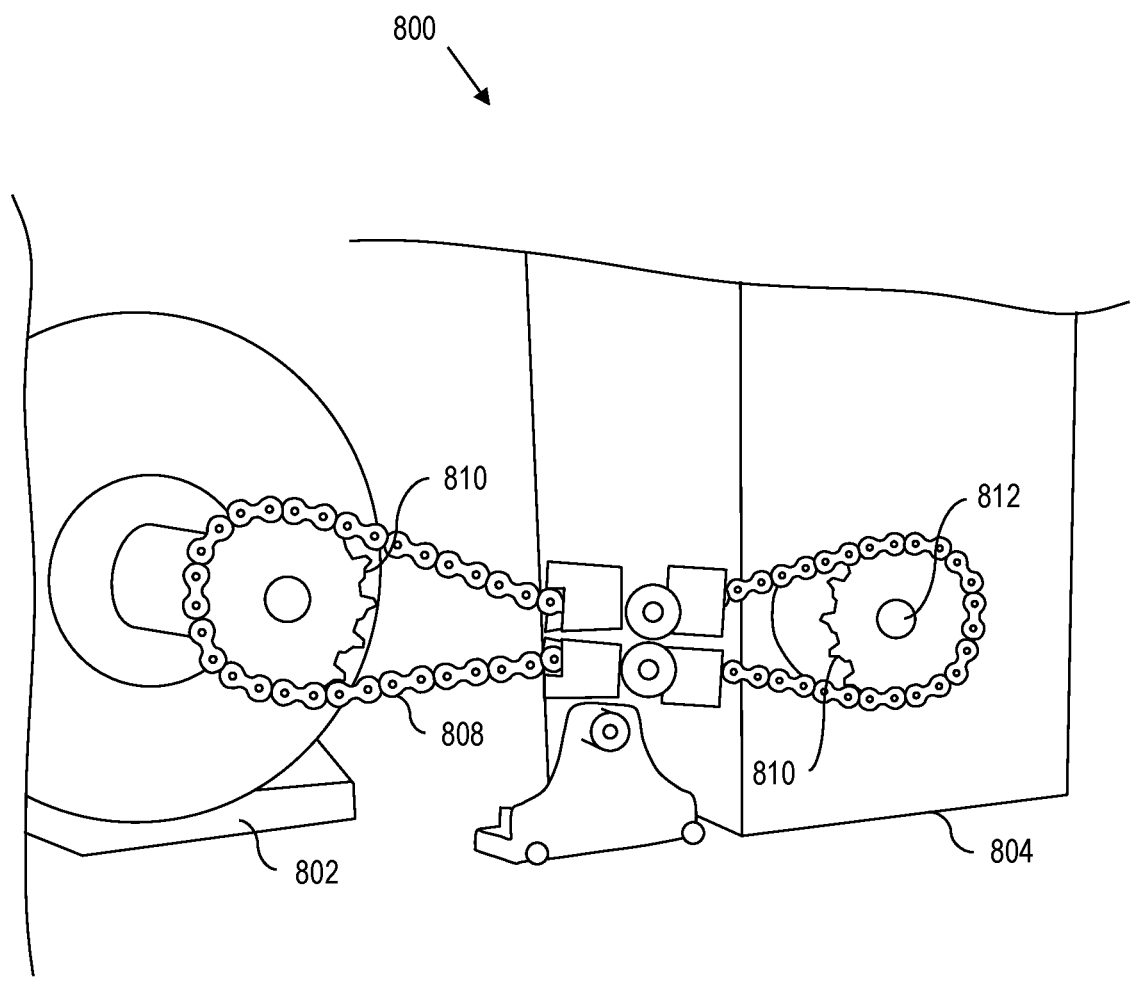
FIG. 8 is an illustration of yet additional aspects of a multi-head pumping system, which can function as part of a liquid-liquid extraction system, according to aspects of the present disclosure.
Figure 9:
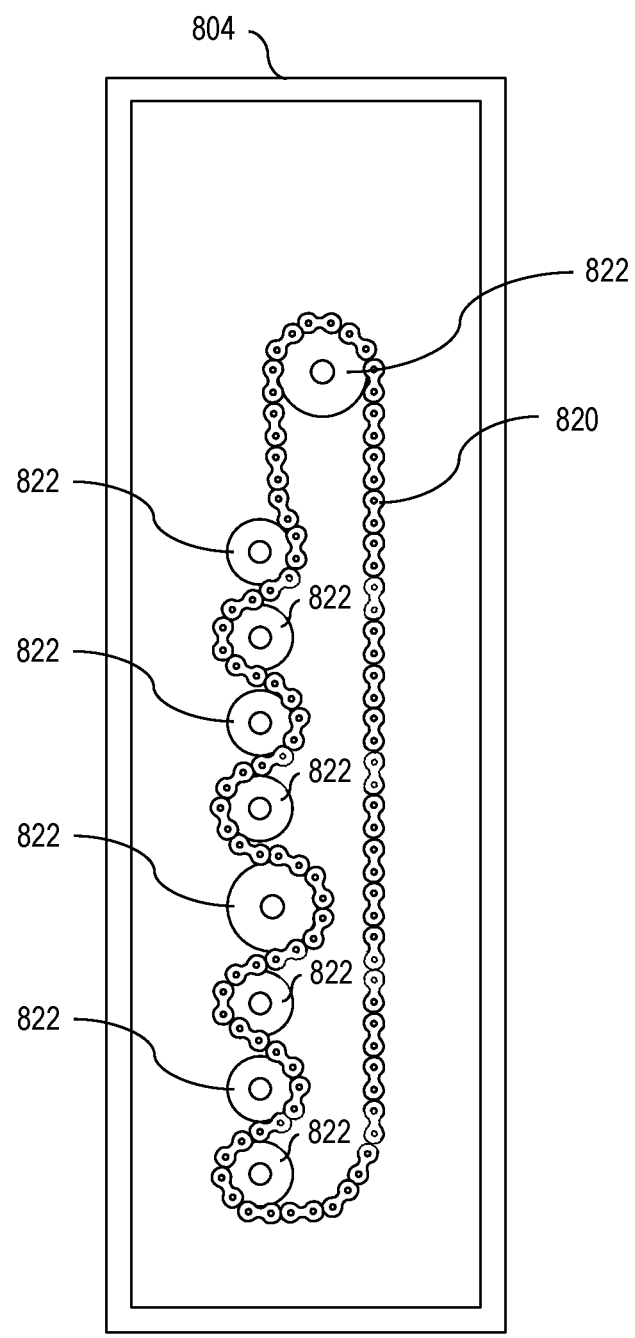
FIG. 9 schematically illustrates a chain drive pump system according to aspects of the present disclosure.
Figure 10:
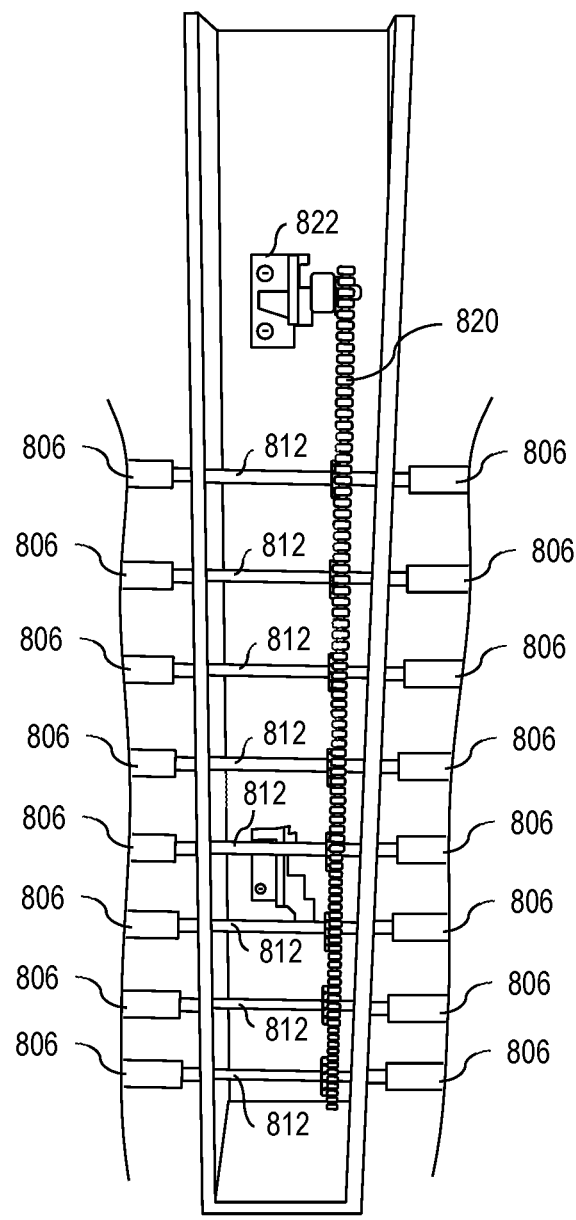
FIG. 10 schematically illustrates another view of the chain drive pump system of FIG. 9.

Referring generally to FIG. 8, FIG. 9, and FIG. 10, another example configuration of a power transmission system is illustrated, which can be used with any combination of features described herein. The example pumping system 800 is comprised of a one large motor 802, a power transmission system 804 that drive multiple pump heads.

As illustrated in FIG. 8, a first chain 808 is utilized to couple power from the motor 802 to the power transmission system 804, e.g., via sprockets 810. In the illustrative example, the sprocket 810 on the power transmission system 804 is coupled to a shaft 812 that couples power to pump head(s) as best illustrated in FIG. 10.

Referring generally to FIG. 9 and FIG. 10, the power transmission system 804 couples power to the pump heads 806. An example of the power transmission system 804 is illustrated in greater detail. Notably, the gearbox of the previous embodiment is replaced with a second chain 820 (e.g., a drive chain), and sprockets 822.

This approach may result in a simpler and less expensive configuration, e.g., compared to the use of a gearbox.

In this configuration, the second chain 820 and two sprockets 822 are utilized to transmit power from the motor 802 (which is connected to one of the shafts 812 of the multi-head pumping system). The second chain 820 transmits power from the same shaft 812 to all of the shafts carrying the pump heads 806 (each shaft has a sprocket 822). The second chain 820 can run, for example in serpentine shape between the shafts to have a good traction, as best illustrated in FIG. 9.

Of course, any combination of motion (or power) transmission system, gearbox(es), belts and pulleys, chains and sprockets, etc., can be utilized, depending upon the specific configuration and process requirements.

There are a number of advantages of certain configurations herein. A multiple-head pump can be used to deliver or transfer a single process liquid from a common vessel through multiple independent lines.

A multiple-head pump can be used to deliver or transfer any number of different process liquids from and to individual vessels, e.g., each through an independent line.

Also, a multiple-head pump eliminates the need to employ multiple individual motor-pump systems for each transferring line, as one motor can be used to move the process liquids in more than one line.

If similar pumpheads are used, the process liquids can be transferred approximately at the same flow rate, eliminating the need of flow controllers in each line. The motor speed sets a common flow rate for all pumps. On the other hand, if different flow rates are required, a different pumphead, or a flow restricting device (valve or other component) can be installed for the specific transferring line.

The compact configuration reduces significantly the footprint required for the pumping system.

A wide range in the number of pumping heads can be accommodated in this design. For example, a desulfurization system described herein can use twenty pump heads (or other number of pump heads).

Maintenance operations and costs also benefits from this configuration. For instance, in practical applications, a malfunction of a specific pump head does not interrupt the operations of the other pumps, and a malfunctioned pump head can be replaced in a timely manner without a significant disruption of the overall process.

In an example embodiment, all internal parts of the motion transmission system are same in sizes according to their own category. Thus, a spare replacement can be easily stocked and make available to reduce maintenance time.

Pressure

Figure 11:
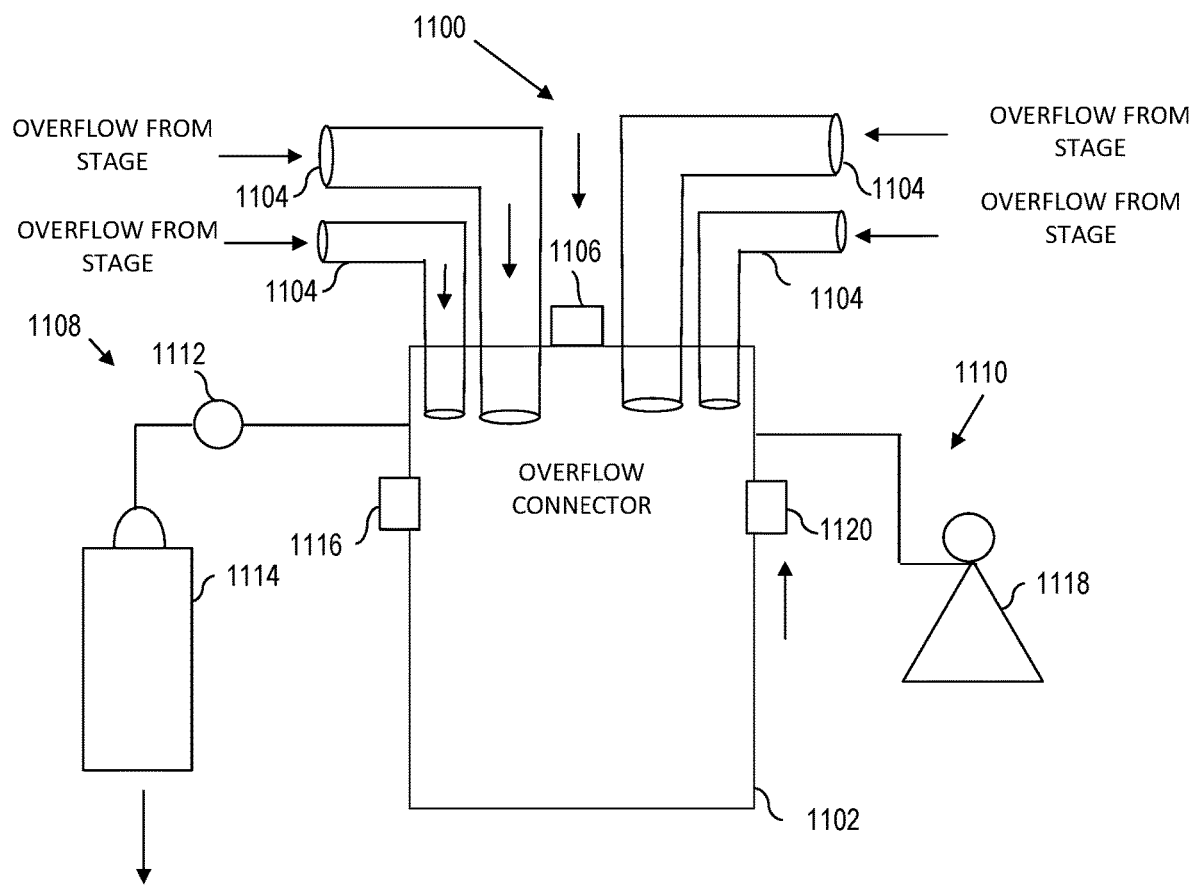
FIG. 11 is an illustration of an optional overflow connector that can be used to operate under various pressure conditions.

Referring to FIG. 11, an optional overflow connector 1100 is illustrated. The overflow connector 1100 can be utilized with any stage or combination thereof described more fully herein. The overflow connector 1100 enables an example convenient means to adapt a stage to operate under various pressure considerations, e.g., atmospheric, vacuum, positive pressure, etc.

The extract output from each tower can be equipped with a valve. Such a valve can be regulated to adjust the ratio between extract and raffinate. In addition, the raffinate and extract outputs can each be equipped with flow meters (analog or digital) to determine the actual ratio.

As illustrated, the overflow connector 1100 includes a housing 1102, and a set of overflow lines 1104 that couple to the housing 1102. The overflow lines 1104 basically form a star/hub and spoke configuration. The overflow lines 1102 can be analogous to the overflow lines shown schematically in the overflow control system 444 (FIG. 4). Basically, any line and optional control valve are utilized to couple a corresponding overflow port from an associated stage to the overflow connector 1100.

A vent 1106 coupled to the housing enables the overflow connector to handle atmospheric operation.

The overflow connector 1100 also includes a high pressure side 1108 and a low pressure side 1110.

The high pressure side 1108 includes a regulator 1112 that couples a high pressure source 1114 (e.g., high pressure inert gas) to the housing 1102. The high pressure side 1108 also includes a pressure relief vent 1116 that can be opened to release pressure in the overflow connector 1102.

The low pressure side 1110 includes a vacuum source 118 (e.g., a vacuum pump) that couples to the housing 1102. The low pressure side 1110 also includes a vacuum relief vent 1120 that can be controlled to release the vacuum in the overflow connector 1102.

The operating pressure can thus be maintained in a multistage system through the overflow lines and overflow collector. For operations at atmospheric pressure, the overflow collector is properly vented to the ambient to allow additional air in, or relieve pressure. For vacuum operations, the overflow collector can be connected to a vacuum pump or vacuum station to proper maintain nominal pressure. Finally, high pressure operation utilize a pressure source to increase the pressure in the overflow connector to maintain nominal pressure.

Miscellaneous

Aspects herein remove impurities from liquid source, e.g., from a tank of locally-procured impure liquid such as diesel, or JP8 fuel. Such a system can comprise any combination of tanks, valving, pumps, components, structures, and processes described more fully herein, packaged in a portable form factor, or otherwise.

For instance, a system as described herein can efficiently remove sulfur-containing impurity molecules from hydrocarbon liquid fuels ('desulfurization') in continuous flow, using a closed-loop arrangement that recycles the solvent that is used to extract sulfur from the diesel fuel or JP8. As a result, very low sulfur impurity concentrations ('deep desulfurization') can be achieved, even in point of need applications, to desulfurize significant amounts of fuel. According to some embodiments, oxidative desulfurization ODS') and enhanced extraction function in tandem, so as to achieve deep desulfurization.

Aspects herein can also be used to remove other impurities, aromatics, and other organic contaminants from sources, such as fuels, organic solvents and other non-polar compounds. In this regard, the systems herein can be adapted and expanded to alternative configurations, e.g., for pharmaceutical, manufacturing, chemical processing, etc.

By way of example, an extraction system can comprise at least one extraction stage. Here, like the sulfur fuel example, each extraction stage comprises a separation vessel that receives a liquid having an undesirable component at an unacceptable level to be reduced, with an extraction liquid. Separation within the separation vessel (e.g., phase separation) separates the liquid mixed with the extraction liquid into liquid having a reduced level of the undesirable component, and an extract that includes the undesirable component removed from the liquid. The liquid having the reduced level of the undesirable component exits the separation vessel at a first output (e.g., the top of the vessel) and the extract exits the separation vessel at a second output (e.g., the bottom of the vessel). Here, the extraction liquid is selected so as to mix with the liquid and to pull at least a portion of the undesirable component from the liquid. In this regard, stages can be cascaded to incrementally decrease the overall level of the undesirable component in the liquid to a desirable level. In this regard, systems and components can be adapted to the liquid using concepts analogous to that described herein, but adapted to the liquid and the undesirable component within the liquid.

Figure 12:
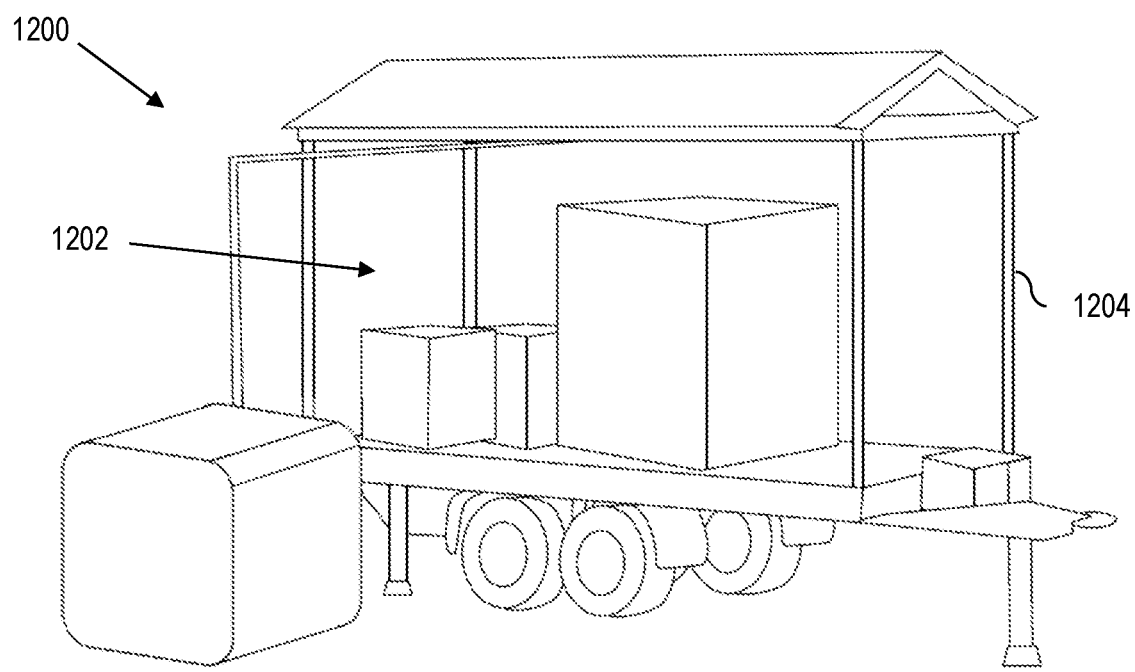
FIG. 12 is a schematic illustration of the system mounted onto a trailer.

Referring to FIG. 12, various aspects herein can be configured into a relatively small system 1200. By way of example, a liquid-liquid extraction system 1202 (analogous to that described more fully herein using any embodiments in any combinations), can be mounted on or otherwise contained within a portable platform 1204, e.g., as an example a system could be enclosed in a Connex (shipping container) or put on the back of a trailer or similar kind of enclosure. In some embodiments, the system can come with its own solar panels which can provide partial power the system (e.g., to provide solar heating, photovoltaic energy, etc.).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Aspects of the disclosure were chosen and described in order to best explain the principles of the disclosure and the practical application, and to enable others of ordinary skill in the art to understand the disclosure for various embodiments with various modifications as are suited to the particular use contemplated.

What is claimed is:

1. A liquid-liquid extraction system comprising:
   a plurality of extraction stages each of which comprises a separation vessel having a chamber, a primary input, a raffinate output, an extract output, and a level sensor coupled to the chamber to measure a level of liquid therein, wherein an input liquid is presented to the chamber via the primary input to enable phase separation of the input liquid into a raffinate and an extract such that the raffinate exits the separation vessel at the raffinate output while the extract exits the separation vessel at the extract output;
   a pumping system comprising:
      a single motor;
      a power transmission system; and
      a plurality of pumpheads each of which is responsive to the single motor and the power transmission system and fluidly cooperative with a corresponding one of the plurality of extraction stages; and
   a controller where the extraction stages collectively extract impurities from a source liquid using an extraction liquid; cooperative with each level sensor and the pumping system such that during operation of the liquid-liquid extraction system an equal flow of liquid takes place between each of the plurality of extraction stages while a level of liquid is controlled in each chamber by processing instructions to:
      read an output of the corresponding level sensor;
      compare the output of the corresponding level sensor to a target;
      cause the associated chamber to receive additional liquid to raise the liquid level in the chamber if the output is lower than the target; and
      cause the associated chamber to drain liquid to lower the liquid level in the chamber if the output is higher than the target.

2. The liquid-liquid extraction system of claim 1, wherein:
   each separation vessel further comprises an auxiliary input and a drain output; and
   the controller is further programmed to:
      cause the associated chamber to receive additional liquid to raise the liquid level in the chamber if the output is lower than the target by implementing instructions to add extraction liquid to the corresponding chamber via the auxiliary input; and
      cause the associated chamber to drain liquid to lower the liquid level in the chamber if the output is higher than the target by implementing instructions to cause the associated chamber to drain liquid via the drain output to lower the liquid level in the chamber.

3. The liquid-liquid extraction system of claim 2, wherein the auxiliary input and the drain output share a common access to the corresponding separation vessel, further comprising a valve system that is operated by the controller to control whether the auxiliary input, the drain output, or neither are open to the common access to the separation vessel.

4. The liquid-liquid extraction system of claim 1, wherein the plurality of extraction stages cascade in series and comprise a first stage, a last stage and intermediate stages, wherein:
   at the first stage, the source liquid mixes with the extraction liquid from a first one of the intermediate stages defining the input liquid for the first stage, and the input liquid is fed in the chamber of the first stage;
   at each intermediate stage, the raffinate from a previous one of the intermediate stages and the extraction liquid from a subsequent one of the intermediate stages mixes to define the input liquid for a corresponding one of the intermediate stages, and the input liquid is fed into the chamber of the corresponding one of the intermediate stages; and
   at the last stage, the raffinate from a last one of the intermediate stages mixes with the extraction liquid defining the input liquid for the last stage, and the input liquid is fed into the chamber of the last stage.

5. The liquid-liquid extraction system of claim 1, wherein the controller is further operatively programmed to control an overall liquid level and interphase, the interphase comprising a line between light phase and heavy phase, in the plurality of extraction stages to ensure that under continuous operating conditions, the light phase is continually pushed out of the raffinate output of a corresponding extraction stage at rate close to a target flow rate and the heavy phase is pulled at a desired rate from the extract output of each corresponding extraction stage to move to the next extraction stage.

6. The liquid-liquid extraction system of claim 1, wherein the controller is operatively programmed to receive a signal from each level sensor, and when a level sensor of an associated extraction stage indicates that a liquid level within the associated extraction stage is below the raffinate output, the controller closes a valve on the raffinate output so that the pumping system only pulls extraction liquid from the previous extraction stage, and opens a fill valve of the associated extraction stage to let extraction liquid into the associated extraction stage to raise the raffinate level above the raffinate output so that raffinate flows out of the raffinate output once the valve on the raffinate output is re-opened.

7. The liquid-liquid extraction system of claim 1, wherein the controller is operatively programmed to receive a signal from each level sensor, and when a level sensor of an associated extraction stage indicates that a liquid level within the associated extraction stage is below the raffinate output, the controller closes a valve on the raffinate output so that the pumping system only pulls extraction liquid from the previous extraction stage, and opens a fill valve the associated extraction stage to let a processed source liquid into the associated extraction stage to raise the raffinate level above the raffinate output so that raffinate flows out of the raffinate output once the valve on the raffinate output is re-opened.

8. The liquid-liquid extraction system of claim 1, wherein the controller is operatively programmed to receive a signal from each level sensor, and when a level sensor of an associated extraction stage indicates that an interphase is above the raffinate output, the controller closes a valve on the raffinate output of the associated extraction stage so that the extraction liquid does not leave from the raffinate output, and opens a drain valve on the associated extraction stage to let extraction liquid out of the associated extraction stage, lowering a liquid level to or below a liquid exit port so that the liquid continues to flow out of the liquid exit port.

9. The liquid-liquid extraction system of claim 1, wherein the controller is operatively programmed to receive a signal from each level sensor, and when a level sensor of an associated extraction stage indicates that a level of liquid in an associated extraction stage is below a first threshold, the controller closes a valve on the raffinate output until the liquid in the associated extraction stage reaches a predefined target.

10. The liquid-liquid extraction system of claim 1, wherein the controller is operatively programmed to receive a signal from each level sensor, and when a level sensor of an associated extraction stage indicates that a level of liquid in an associated extraction stage is above a first threshold, the controller opens a drain valve on the associated extraction stage to let extraction liquid out of the associated extraction stage to lower a liquid level when the associated level sensor detects that a liquid height in the associated extraction stage is above a second threshold.

11. The liquid-liquid extraction stage of claim 10, wherein the second threshold is exceeded when liquid from the associated extraction stage exits to an overflow vessel via an unrestricted line.

12. The liquid-liquid extraction system of claim 1, wherein the controller is further operatively programmed to feed extraction liquid into an associated extraction stage to raise the extraction liquid by implementing instructions to open a feed valve under pressure on the associated extraction stage to raise the level of the extraction liquid, and close a fill valve on the associated extraction stage when the level of the extraction liquid reaches a predetermined level.

13. The liquid-liquid extraction system of claim 1 wherein the controller is further operatively programmed to drain extraction liquid from the associated extraction stage to lower the extraction liquid by implementing instructions to open a drain valve on the associated extraction stage to drain extraction liquid, and close the drain valve when the level of extraction liquid reaches a predetermined level.

14. The liquid-liquid extraction system of claim 1, wherein the controller is further programmed with instructions to:
  programmably control a first valve that feeds extraction liquid to automatically cause extraction liquid to be fed into the associated extraction stage to raise the extraction liquid if the output is lower than the target; and
  programmably control a second valve that operates a drain to drain extraction liquid automatically from the associated extraction stage to lower the extraction liquid if the output is higher than the target.

15. The liquid-liquid extraction system of claim 1, wherein the controller is further programmed to:
  cause extraction liquid to be fed into the associated extraction stage to raise the extraction liquid by sending a first message to cause an operator to manually operate a first manual valve; and
  cause extraction liquid to be drained from the associated extraction stage to lower the extraction liquid by sending a second message to cause an operator to manually operate a second manual valve.

16. The liquid-liquid extraction system of claim 1, wherein the pumping system comprises a pumping station that:
  draws the source liquid from a first reservoir such that the source liquid enters a first one of the plurality of extraction stages and draws the raffinate from the first one of the plurality of extraction stages so as to cascade into a next one of the plurality of extraction stages, wherein the raffinate that exits a final one of the plurality of extraction stages is a purified liquid; and
  draws the extraction liquid from a second reservoir into a last one of the plurality of extraction stages and draws the extraction liquid from the last one of the plurality of extraction stages so as to cascade into a preceding one of the plurality of extraction stages, wherein the extraction liquid that exits a first one of the plurality of extraction stages is collected into a third reservoir.

17. The liquid-liquid extraction system of claim 1, wherein each of the plurality of pumpheads is driven to cause flow of the raffinate, the extract, or both for the corresponding extraction stage, wherein a pumping action mixes the raffinate and the extraction liquid before entering each of the plurality of extraction stages without the need for a separate mixer.

18. The liquid-liquid extraction system of claim 17, wherein the power transmission system couples the corresponding pump to each of the plurality of pumpheads via a pulley, sprocket, gear system or combination thereof.

19. The liquid-liquid extraction system of claim 1, wherein:
  the source liquid comprises an oxidized fuel;
  the extraction liquid comprises ethanol based solution;
  the raffinate comprises a reduced sulfur fuel; and
  the separation vessel performs phase separation to separate the oxidized fuel and the ethanol into a reduced sulfur fuel and the extract, wherein the extract is comprised of the ethanol based solution and at least a portion of the sulfur transferred from the mixed oxidized fuel, the reduced impurity fuel exits the separation vessel at the raffinate output, and the extract exits the separation vessel at the extract output.

20. A continuous liquid-liquid extraction system comprising:
  a plurality of extraction stages each of which comprises a separation vessel having a chamber, a primary input, a raffinate output, an extract output, and a level sensor coupled to the chamber to measure a level of liquid therein, wherein an input liquid is presented to the chamber via the primary input to enable phase separation of the input liquid into a raffinate and an extract such that the raffinate exits the separation vessel at the raffinate output while the extract exits the separation vessel at the extract output;
  a pumping system comprising:
    a single motor;
    a power transmission system; and
    a plurality of pumpheads each of which is responsive to the single motor and the power transmission system and fluidly cooperative with a corresponding one of the plurality of extraction stages; and
  a controller cooperative with each level sensor and the pumping system such that during operation of the liquid-liquid extraction system an equal flow of liquid takes place between each of the plurality of extraction stages while a level of liquid is controlled in each chamber by processing instructions to:
read an output of the corresponding level sensor;
compare the output of the corresponding level sensor to a target;
cause the associated chamber to receive additional liquid to raise the liquid level in the chamber if the output is lower than the target; and
cause the associated chamber to drain liquid to lower the liquid level in the chamber if the output is higher than the target, wherein the controller and the pumping system operate independently of one another.

* * * * *